United States Patent
Kinomura

(10) Patent No.: US 11,945,320 B2
(45) Date of Patent: Apr. 2, 2024

(54) DISCHARGING ASSEMBLY, POWER FEEDING SYSTEM, AND POWER FEEDING METHOD

(71) Applicant: TOYOTA JIDOSHA KABUSHIKI KAISHA, Toyota (JP)

(72) Inventor: Shigeki Kinomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/886,042

(22) Filed: Aug. 11, 2022

(65) Prior Publication Data
US 2023/0048414 A1    Feb. 16, 2023

(30) Foreign Application Priority Data

Aug. 16, 2021  (JP) ................. 2021-132277

(51) Int. Cl.
*B60L 53/16*  (2019.01)
*B60L 55/00*  (2019.01)
*H01R 31/06*  (2006.01)
*H02J 7/00*  (2006.01)

(52) U.S. Cl.
CPC ............... *B60L 53/16* (2019.02); *B60L 55/00* (2019.02); *H02J 7/0042* (2013.01); *B60L 2210/10* (2013.01); *H01R 31/065* (2013.01)

(58) Field of Classification Search
CPC ...... B60L 53/16; B60L 55/00; B60L 2210/10; H02J 7/0042; H01R 31/065
USPC .......................................................... 307/10.1
See application file for complete search history.

(56) References Cited

U.S. PATENT DOCUMENTS

| | | |
|---|---|---|
| 10,836,371 B1 | 11/2020 | Thiruvengadam et al. |
| 2015/0038020 A1 | 2/2015 | Kinomura et al. |
| 2020/0122585 A1* | 4/2020 | Bhat ................. G05B 19/0426 |
| 2021/0104851 A1 | 4/2021 | Bhat et al. |

FOREIGN PATENT DOCUMENTS

| | | |
|---|---|---|
| JP | 5099281 B1 | 12/2012 |
| WO | 2013/030653 A2 | 3/2013 |

* cited by examiner

*Primary Examiner* — Michael R. Fin
(74) *Attorney, Agent, or Firm* — Dinsmore & Shohl LLP

(57) ABSTRACT

A discharging assembly includes: a first end to which electric power is input from a connected discharging port; a first voltage line, a second voltage line and a neutral line; and a second end that outputs first AC power and second AC power. The first AC power applies a first voltage between the first voltage line and the neutral line. The second AC power applies a second voltage between the second voltage line and the neutral line. The second end includes a first electrical outlet and a second electrical outlet. The first electrical outlet includes a first voltage terminal connected to the first voltage line, a second voltage terminal connected to the second voltage line, and a ground terminal connected to the neutral line. The second electrical outlet includes a voltage terminal connected to the first voltage line, and a ground terminal connected to the neutral line.

12 Claims, 16 Drawing Sheets

DISCHARGING ASSEMBLY, POWER FEEDING SYSTEM, AND POWER FEEDING METHOD

This nonprovisional application is based on Japanese Patent Application No. 2021-132277 filed on Aug. 16, 2021 with the Japan Patent Office, the entire contents of which are hereby incorporated by reference.

BACKGROUND

Field

The present disclosure relates to a discharging assembly including a discharging connector connectable to a discharging port, a power feeding system, and a power feeding method.

Description of the Background Art

For example, Japanese Patent No. 5099281 discloses a connector structure for taking out electric power stored in a power storage device mounted on a vehicle to the outside of the vehicle.

SUMMARY

According to the above-described connector structure, one type of electric power is taken out through a discharging port (e.g., inlet). Therefore, it is difficult to drive a plurality of types of electrical devices having different driving voltages by using the taken-out electric power.

In order to solve the above-described problem, it is conceivable to provide two or more discharging ports such that a different voltage is output for each discharging port. However, in such a method two or more discharging ports are required. Such a method requires great design change.

The present disclosure has been made to solve the above-described problem, and an object of the present disclosure is to provide a discharging assembly, a power feeding system, and a power feeding method, which make it possible to output a plurality of types of AC power having different voltages, while suppressing design change.

A discharging assembly according to a first aspect of the present disclosure includes a discharging connector configured to be connectable to a discharging port. The discharging assembly includes: a first end to which electric power is input from the connected discharging port; a first voltage line, a second voltage line and a neutral line; and a second end that outputs first AC power and second AC power. The discharging connector includes the first end of the discharging assembly. The first AC power applies a first voltage between the first voltage line and the neutral line. The second AC power applies a second voltage between the second voltage line and the neutral line. The second end of the discharging assembly includes a first electrical outlet and a second electrical outlet. The first electrical outlet includes a first voltage terminal connected to the first voltage line, a second voltage terminal connected to the second voltage line, and a ground terminal connected to the neutral line. The second electrical outlet includes a voltage terminal connected to the first voltage line, and a ground terminal connected to the neutral line.

In the above-described discharging assembly, the second end of the discharging assembly outputs the first AC power and the second AC power. Due to the three-line structure formed by the first voltage line, the second voltage line and the neutral line, a voltage applied between the first voltage line and the second voltage line in the first electrical outlet is a total of the first voltage and the second voltage, and a voltage applied between the first voltage line and the neutral line in the second electrical outlet is the first voltage. Thus, AC power having different voltages is output to the first electrical outlet and the second electrical outlet. According to the above-described discharging assembly, it is possible to output a plurality of types of AC power having different voltages, while suppressing design change. The first voltage and the second voltage may be the same as or different from each other.

The first voltage line, the second voltage line and the neutral line may be provided to extend from the first end to the second end. The first AC power and the second AC power may be input from the discharging port to the first end of the discharging assembly, and transmitted to the second end of the discharging assembly through the first voltage line, the second voltage line and the neutral line. According to the above-described configuration, it is easier for the second end of the discharging assembly to output the first AC power and the second AC power.

A vehicle may include the discharging port. The vehicle may further include a power storage device, a first power conversion circuit and a second power conversion circuit. Each of the first power conversion circuit and the second power conversion circuit may be configured to receive DC power supplied from the power storage device and output AC power to the discharging port side. The discharging port may include a first output terminal, a second output terminal, and a ground terminal grounded to a body of the vehicle. Between the first output terminal and the ground terminal in the discharging port, the first AC power may be output from the power storage device through the first power conversion circuit. Between the second output terminal and the ground terminal in the discharging port, the second AC power may be output from the power storage device through the second power conversion circuit. The first end of the discharging assembly may include a first input terminal connected to the first voltage line, a second input terminal connected to the second voltage line, and a ground terminal connected to the neutral line. When the discharging connector and the discharging port are connected to each other, the first input terminal, the second input terminal and the ground terminal of the first end may be connected to the first output terminal, the second output terminal and the ground terminal of the discharging port, respectively.

According to the above-described configuration, the first AC power and the second AC power generated by the first power conversion circuit and the second power conversion circuit in the vehicle are input from the discharging port of the vehicle to the first end (discharging connector) of the discharging assembly. Since the voltage applied between the first voltage line and the second voltage line is generated by the two power conversion circuits, a load on one power conversion circuit is reduced. Each power conversion circuit may be configured to convert DC power output from the power storage device into AC power. Each power conversion circuit may be configured to be capable of converting at least one of a voltage and a frequency. Each power conversion circuit may be an inverter.

The discharging assembly may further include a converter that converts two lines connected to the first end into three lines, the three lines including the first voltage line, the second voltage line and the neutral line. The first end and the converter may be electrically connected to each other through the two lines (e.g., two voltage lines). The converter and the second end may be electrically connected to each other through the three lines (first voltage line, second voltage line and neutral line). According to the above-described discharging assembly, it is possible to receive the AC power from the discharging port through the single-phase two-line system, and output the AC power to the second end (including the electrical outlets) through the single-phase three-line system.

The second end may further include a third electrical outlet. The third electrical outlet may include a voltage terminal connected to the second voltage line, and a ground terminal connected to the neutral line.

According to the above-described configuration, it is possible to output the AC power to each of the first to third electrical outlets. A voltage applied between the second voltage line and the neutral line in the third electrical outlet is the second voltage.

Each of the first voltage and the second voltage may be equal to or higher than 95 V and equal to or lower than 150 V. According to the above-described configuration, it is possible to use the first electrical outlet as a power supply for an electrical device having a driving voltage around single-phase AC 200 V, and use the second electrical outlet (or the third electrical outlet) as a power supply for an electrical device having a driving voltage around single-phase AC 100 V. The voltage applied between the first voltage line and the second voltage line in the first electrical outlet may be twice as high as the voltage applied between the first voltage line and the neutral line in the second electrical outlet.

The first end of the discharging assembly may include a detection terminal that outputs a connector signal indicating a requested voltage value of the discharging connector electrically connected to the discharging port.

According to the above-described configuration, it is easier for the discharge entity (e.g., vehicle) including the discharging port to apply the voltage corresponding to the discharging connector (i.e., voltage requested by the discharging connector) to the discharging connector.

The connector signal may be a potential signal indicating a state of the discharging connector and the discharging port, in addition to the requested voltage value. The discharging connector may further include a detection circuit that changes a potential of the detection terminal in accordance with the state of the discharging connector and the discharging port.

According to the above-described configuration, it is easier for the discharge entity (e.g., vehicle) including the discharging port to recognize the state of the discharging connector and the discharging port (e.g., whether the discharging connector and the discharging port are connected to each other) and to supply the electric power to the discharging connector in a timely manner.

The neutral line may be electrically connected to the detection terminal through the detection circuit. The state determined based on the connector signal may include a non-fitted state, a fitted state and a connected state. The non-fitted state may be a state in which the discharging connector and the discharging port are not electrically connected to each other. The fitted state may be a state in which the discharging connector and the discharging port are electrically connected to each other and the discharging connector is not latched. The connected state may be a state in which the discharging connector and the discharging port are electrically connected to each other and the discharging connector is latched. The detection circuit may include a switch that works in conjunction with a latch of the discharging connector, and an electric resistance connected in parallel with the switch.

According to the above-described configuration, the potential of the detection terminal changes in accordance with whether the discharging port and the first end (input end) of the discharging assembly are electrically connected to each other. In addition, the potential of the detection terminal changes in accordance with whether the discharging connector is latched. Therefore, it is easier to make proper determination among the non-fitted state, the fitted state and the connected state based on the potential of the detection terminal.

In any discharging assembly described above, the discharging connector may include the second end, in addition to the first end.

In the above-described configuration, the discharging connector includes the second end (including the first electrical outlet and the second electrical outlet). According to the above-described configuration, it is easier to achieve a reduction in size of the discharging assembly. The discharging connector alone may function as a discharging assembly.

Any discharging assembly described above may further include a housing into which a circuit electrically connected to the discharging connector is built, and a cable that connects the discharging connector to the housing. The housing may include the second end.

In the above-described configuration, the discharging connector including the first end and the housing including the second end are connected to each other through the cable, and thus, it is easier to arrange, at distant locations, the input end (first end) of the discharging assembly connectable to the discharging port and the output end (second end) of the discharging assembly including the first electrical outlet and the second electrical outlet. Therefore, a degree of freedom of arrangement of the first electrical outlet and the second electrical outlet is higher. In addition, since a part of the discharging circuit can be housed in the housing, it is easier to achieve a reduction in size of the discharging connector.

A power feeding system according to a second aspect of the present disclosure includes a vehicle including a discharging port, and a discharging assembly configured to be connectable to the discharging port. The discharging assembly includes: a first end to which electric power is input from the connected discharging port; a first voltage line, a second voltage line and a neutral line; and a second end that outputs first AC power and second AC power. The first AC power applies a first voltage between the first voltage line and the neutral line. The second AC power applies a second voltage between the second voltage line and the neutral line. The second end includes a first electrical outlet and a second electrical outlet. The first electrical outlet includes a first voltage terminal connected to the first voltage line, a second voltage terminal connected to the second voltage line, and a ground terminal connected to the neutral line. The second electrical outlet includes a voltage terminal connected to the first voltage line, and a ground terminal connected to the neutral line. The vehicle further includes a power storage device and a power conversion circuit. The power conversion circuit is configured to receive electric power supplied from the power storage device and output electric power to the discharging port.

According to the above-described power feeding system as well, similarly to the above-described discharging assembly, it is possible to output a plurality of types of AC power having different voltages from the first electrical outlet and the second electrical outlet, while suppressing design change.

The vehicle may be an electrically-powered vehicle (hereinafter, also referred to as "xEV"). The xEV is a vehicle that utilizes electric power as the whole or a part of motive power source. The xEV includes a battery electric vehicle (BEV), a plug-in hybrid electric vehicle (PHEV) and a fuel cell electric vehicle (FCEV).

A power feeding method according to a third aspect of the present disclosure includes: obtaining a requested voltage value of a discharging connector connected to a discharging port; determining whether the discharging connector connected to the discharging port is a single-phase three-line-type connector including a first voltage line, a second voltage line and a neutral line; and when the discharging connector connected to the discharging port is the single-phase three-line-type connector, applying AC voltages between the first voltage line and the neutral line and between the second voltage line and the neutral line such that a first electrical outlet connected to the first voltage line, the second voltage line and the neutral line outputs an AC voltage corresponding to the requested voltage value, and a second electrical outlet connected to the first voltage line and the neutral line outputs an AC voltage corresponding to a half of the requested voltage value.

According to the above-described method as well, similarly to the above-described discharging assembly, it is possible to output a plurality of types of AC power having different voltages from the first electrical outlet and the second electrical outlet, while suppressing design change.

In the determining, when the requested voltage value is within a prescribed range, it may be determined that the discharging connector connected to the discharging port is the single-phase three-line-type connector. When the requested voltage value is outside the prescribed range, it may be determined that the discharging connector connected to the discharging port is not the single-phase three-line-type connector.

According to the above-described configuration, it is possible to easily determine whether the discharging connector connected to the discharging port is the single-phase three-line-type connector, based on the requested voltage value of the discharging connector. The prescribed range may be a prescribed voltage value (one certain point). When the requested voltage value is, for example, 200 V, it may be determined that the discharging connector connected to the discharging port is the single-phase three-line-type connector.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
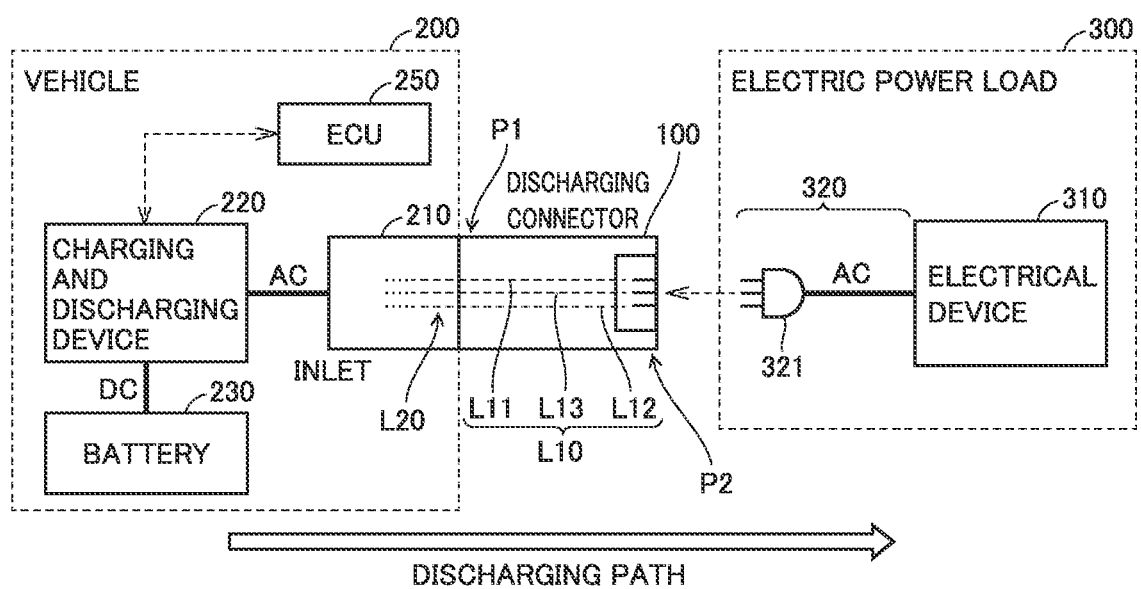
FIG. 1 is an overall configuration diagram of a power feeding system according to an embodiment of the present disclosure.

An embodiment of the present disclosure will be described in detail with reference to the drawings, in which the same or corresponding portions are denoted by the same reference characters and description thereof will not be repeated. Hereinafter, an electronic control unit will be referred to as "ECU". In addition, an alternating current may be referred to as "AC" and a direct current may be referred to as "DC".

FIG. 1 is an overall configuration diagram of a power feeding system according to the present embodiment. Referring to FIG. 1, the power feeding system according to the present embodiment is applied to V2L (Vehicle to Load) in which electric power is directly supplied from a vehicle to an electrical device. In the V2L, using a power converter (e.g., vehicle-mounted inverter) that is designed for the vehicle and not fixed to the ground, electric power is directly supplied to the electrical device, separately from a power system. The power system is a transmission and distribution network system (commercial power system) for supplying electric power from an electric power provider to an electric power user. The vehicle-mounted inverter is a device built into the vehicle to convert DC power of a vehicle-mounted battery for driving into AC power and supply the AC power to the electrical device.

Specifically, the power feeding system according to the present embodiment includes a discharging connector 100 and a vehicle 200, and is configured to supply electric power supplied from vehicle 200 to an electric power load 300 through discharging connector 100. In the present embodiment, discharging connector 100 includes a first end P1 (input end) and a second end P2 (output end), and functions as a discharging assembly. Although any vehicle having the discharging function can be used as vehicle 200, a battery electric vehicle (BEV) that does not include an engine (internal combustion engine) is used as vehicle 200 in the present embodiment.

Electric power load 300 includes an electrical device 310 (device main body), and a power cord 320 connecting to electrical device 310. Electrical device 310 is driven when prescribed AC power is supplied to electrical device 310 through power cord 320. Discharging connector 100 includes an electrical outlet to which a plug 321 of power cord 320 is connectable. Details of the electrical outlet of discharging connector 100 will be described below (see FIGS. 5 and 8).

Vehicle 200 includes an inlet 210 (vehicle inlet), a charging and discharging device 220, a battery 230, and an ECU 250. Inlet 210 and battery 230 correspond to examples of "discharging port" and "power storage device" according to the present disclosure, respectively. Inlet 210 corresponds to a portion of a coupling system for discharging that is fixed in vehicle 200. Battery 230 includes, for example, a secondary battery. Examples of the secondary battery include a lithium ion battery or a nickel-metal hydride battery. Battery 230 may include one or more power storage devices selected from the group consisting of a liquid-based secondary battery, an all-solid-state secondary battery, an assembled battery, and an electric double-layer capacitor. Vehicle 200 is configured to be capable of traveling using electric power stored in battery 230. Vehicle 200 includes an electric motor (not shown) that receives the electric power supplied from battery 230, and travels using motive power generated by the electric motor.

Charging and discharging device 220 is configured to charge battery 230. Specifically, charging and discharging device 220 is configured to convert AC power supplied from the outside of vehicle 200 to inlet 210 into DC power (AC/DC conversion) and output the DC power to battery 230. Charging and discharging device 220 is also configured to discharge the electric power of battery 230 to the outside of vehicle 200. Specifically, charging and discharging device 220 is configured to convert DC power supplied from battery 230 into AC power (DC/AC conversion) and output the AC power to inlet 210.

Figure 2:
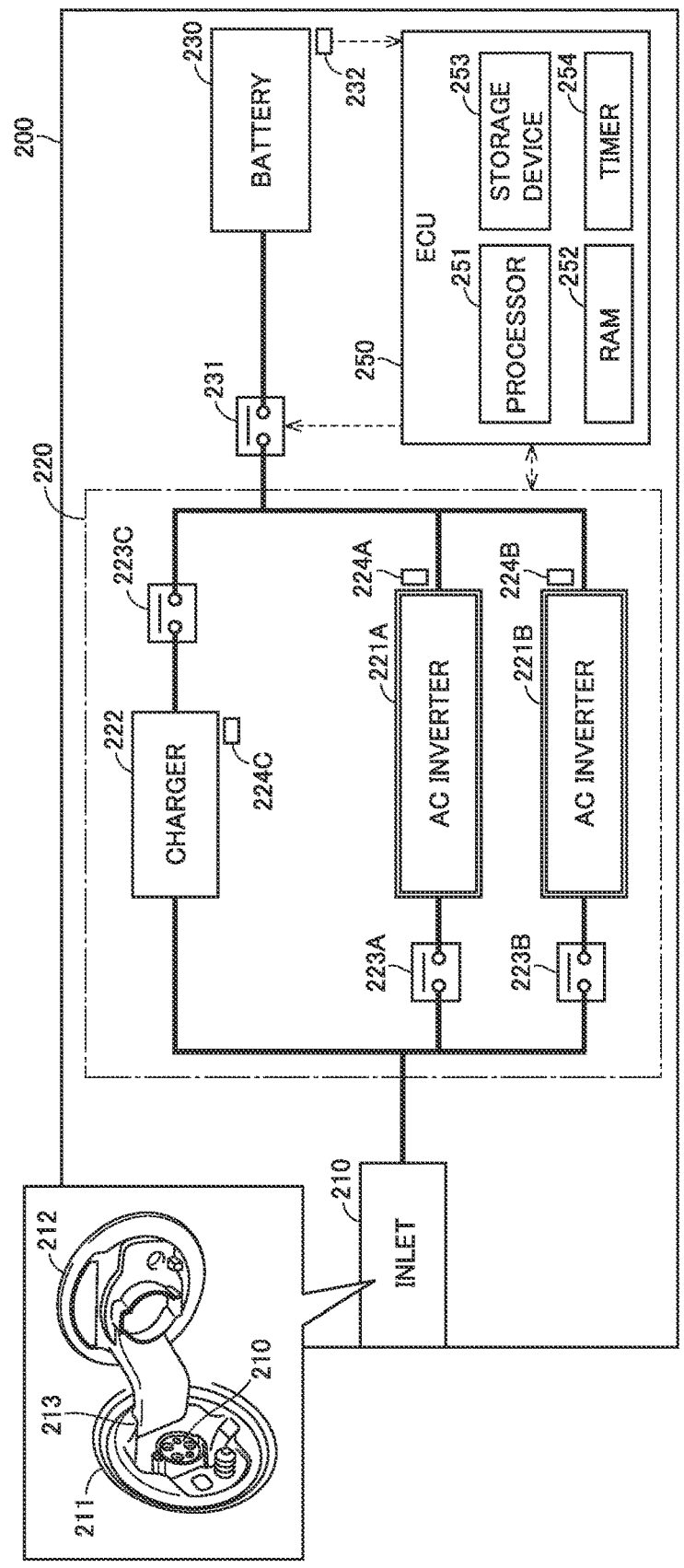
FIG. 2 shows a configuration of a charging and discharging device shown in FIG. 1 and its surroundings.

FIG. 2 shows a configuration of charging and discharging device 220 and its surroundings. Referring to FIG. 2, a system main relay (SMR) 231 is provided between charging and discharging device 220 and battery 230. SMR 231 is configured to switch between connection and disconnection of a power path that connects charging and discharging device 220 and battery 230 to each other. When the electric power is exchanged between inlet 210 and battery 230, SMR 231 is brought into a closed state (connected state) by ECU 250. Battery 230 is provided with a battery management system (BMS) 232. BMS 232 includes various sensors that detect a state of battery 230, and outputs the detection results to ECU 250. Based on the output of BMS 232, ECU 250 can obtain the state (e.g., a temperature, a current, a voltage, a state of charge (SOC), and an internal resistance) of battery 230.

Inlet 210 is arranged in an opening 211 provided in a vehicle body. A lid 212 is provided to open and close opening 211. Lid 212 is configured to be coupled to the vehicle body through an opening and closing mechanism 213 (e.g., hinge), so as to be capable of opening and closing opening 211. Inlet 210 is used when lid 212 is open. When lid 212 is closed, lid 212 covers opening 211 (including inlet 210), thereby prohibiting the use of inlet 210. Inlet 210 according to the present embodiment is an AC inlet. Namely, when inlet 210 is used for charging of battery 230, AC power is input from the outside of vehicle 200 to inlet 210.

ECU 250 is configured to control charging and discharging device 220. ECU 250 may be a computer. ECU 250 includes a processor 251, a random access memory (RAM) 252, a storage device 253, and a timer 254. In the present embodiment, when processor 251 executes a program stored in storage device 253 in ECU 250, various types of control in vehicle 200 are executed. However, various types of control in vehicle 200 are not limited to execution by software, and can also be executed by dedicated hardware (electronic circuit). The number of processors of ECU 250 is arbitrary, and a processor may be provided for each prescribed control.

Between inlet 210 and battery 230, charging and discharging device 220 includes an AC inverter 221A, an AC inverter 221B and a charger 222 that are connected in parallel with each other. AC inverters 221A and 221B may be housed in separate housings, or may be housed in the same housing together. AC inverter 221A and AC inverter 221B correspond to examples of "first power conversion circuit" and "second power conversion circuit" according to the present disclosure, respectively.

A discharging relay 223A is provided between AC inverter 221A and inlet 210. Discharging relay 223A is configured to switch between connection and disconnection of a discharging path extending from AC inverter 221A to inlet 210. In addition, a discharging relay 223B is provided between AC inverter 221B and inlet 210. Discharging relay 223B is configured to switch between connection and disconnection of a discharging path extending from AC inverter 221B to inlet 210. Hereinafter, when AC inverter 221A and AC inverter 221B are not distinguished from each other, AC inverters 221A and 221B will also be collectively referred to as "AC inverter 221".

Figure 3:
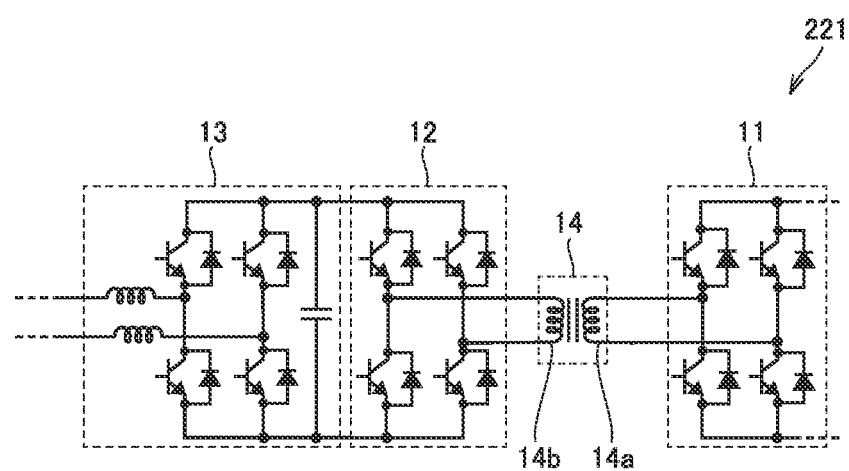
FIG. 3 shows a circuit configuration example of a vehicle-mounted inverter shown in FIG. 2.

FIG. 3 shows a circuit configuration example of AC inverter 221. Referring to FIG. 3 together with FIG. 2, AC inverter 221 includes inverters 11 to 13 and an insulating circuit 14. Each of inverters 11 to 13 includes a full-bridge circuit including four switching elements. Of inverters 11 to 13, inverter 13 located closest to inlet 210 further includes two reactors and one smoothing capacitor. Each switching element included in inverters 11 to 13 is controlled by ECU 250. Insulating circuit 14 is an insulating transformer including a first coil 14a and a second coil 14b.

Inverter 11 converts DC power input from the battery 230 side into high-frequency AC power. Insulating circuit 14 transforms the output (AC power) of inverter 11 in accordance with a coil turn ratio, and transmits the transformed AC power to inverter 12. Inverter 12 rectifies the AC power received from insulating circuit 14, and outputs the rectified power to inverter 13. Inverter 13 converts the DC power received from inverter 12 into AC power having a prescribed frequency, and outputs the AC power to the inlet 210 side.

As described above, AC inverter 221 is configured to convert the DC power input from the battery 230 side into AC power having a prescribed frequency, and output the AC power to the inlet 210 side. The circuit configuration shown in FIG. 3 is one example and can be changed as appropriate. An arbitrary circuit configuration of a known vehicle-mounted inverter may be used. AC inverter 221 may be configured to allow bidirectional power conversion between battery 230 and inlet 210, or may be configured to allow power conversion in only one direction (direction from battery 230 to inlet 210).

Referring again to FIG. 2, AC inverters 221A and 221B are provided with monitoring units 224A and 224B, respectively. Monitoring units 224A and 224B include various sensors that detect states (e.g., voltages, currents and temperatures) of AC inverters 221A and 221B, respectively, and output the detection results to ECU 250. Based on the outputs of monitoring units 224A and 224B, ECU 250 controls AC inverters 221A and 221B. Thus, electric power output from each inverter to inlet 210 (i.e., discharging power of charging and discharging device 220) is adjusted. ECU 250 may be configured to monitor a current of each of AC inverters 221A and 221B, and perform current limitation on the inverter whose current is likely to exceed a prescribed permissible current value (e.g., 15 A). Details of a wiring between each inverter and inlet 210 will be described below (see FIG. 8).

ECU 250 can disconnect AC inverters 221A and 221B from inlet 210 by bringing discharging relays 223A and 223B into the disconnected state, respectively. In the present embodiment, the discharging relay is provided for each inverter. Therefore, each inverter can be individually disconnected from inlet 210. When the discharging relay enters the disconnected state, discharging from the inverter corresponding to this discharging relay to inlet 210 is prohibited. The number of discharging relays is arbitrary. The discharging relays may be arranged to collectively disconnect a plurality of inverters from the inlet.

Each of AC inverters 221A and 221B may be configured to adjust the frequency of the AC power such that AC power having a frequency set initially (e.g., at the time of shipment) is output. Alternatively, ECU 250 may control AC inverters 221A and 221B based on the location of vehicle 200 such that AC power having an appropriate frequency for each region is output from each inverter. ECU 250 may be configured such that a user can set an arbitrary frequency.

A charging relay 223C is provided between charger 222 and battery 230 (more particularly, on the charger 222 side relative to SMR 231). Charging relay 223C is configured to switch between connection and disconnection of a charging path extending from charger 222 to battery 230. When charging relay 223C enters the disconnected state, supply of electric power from inlet 210 through charger 222 to battery 230 is prohibited.

Figure 4:
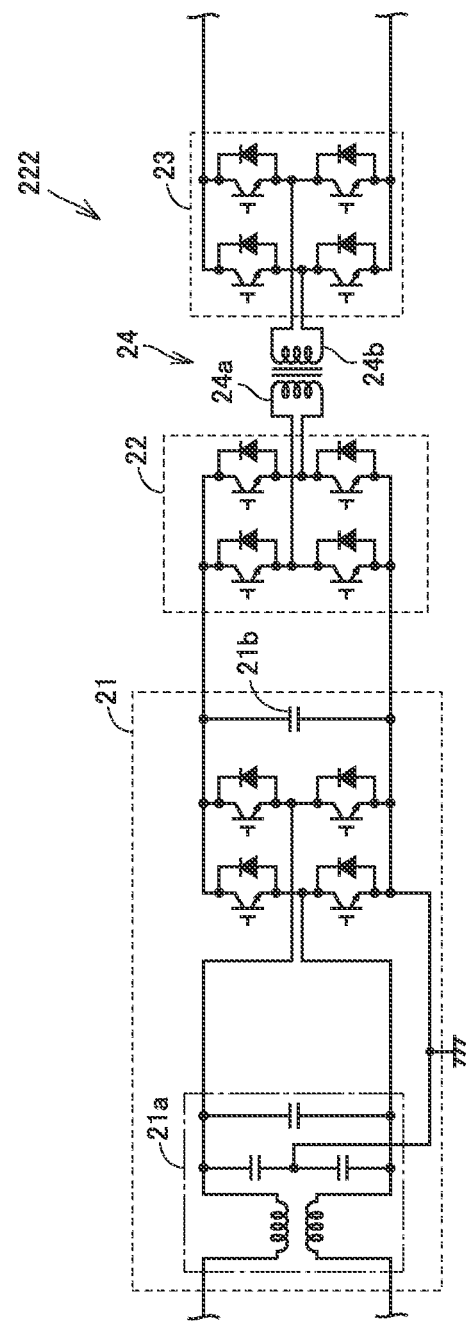
FIG. 4 shows a circuit configuration example of a vehicle-mounted charger shown in FIG. 2.

FIG. 4 shows a circuit configuration example of charger 222. Referring to FIG. 4 together with FIG. 2, charger 222 includes inverters 21 to 23 and an insulating circuit 24. Each of inverters 21 to 23 includes a full-bridge circuit including four switching elements. Of inverters 21 to 23, inverter 21 located closest to inlet 210 further includes a filter circuit 21a and a smoothing capacitor 21b. Filter circuit 21a removes high-frequency noise included in the AC power. Each switching element included in inverters 21 to 23 is controlled by ECU 250. Insulating circuit 24 is an insulating transformer including a first coil 24a and a second coil 24b.

Inverter 21 rectifies AC power input from the inlet 210 side, and outputs the rectified power to inverter 22. Inverter 22 converts the DC power received from inverter 21 into high-frequency AC power. Insulating circuit 24 transforms the output (AC power) of inverter 22 in accordance with a coil turn ratio, and transmits the transformed AC power to inverter 23. Inverter 23 rectifies the AC power received from insulating circuit 24, and outputs the rectified power to the battery 230 side.

As described above, charger 222 is configured to convert the AC power input from the inlet 210 side into DC power, and output the DC power to the battery 230 side. The circuit configuration shown in FIG. 4 is one example and can be changed as appropriate. Charger 222 may be configured to allow bidirectional power conversion between battery 230 and inlet 210, or may be configured to allow power conversion in only one direction (direction from inlet 210 to battery 230). Charger 222 that allows bidirectional power conversion can be used as a power conversion circuit for discharging. Therefore, in the configuration in which charger 222 is configured to allow bidirectional power conversion, either AC inverter 221A or AC inverter 221B may be omitted and charger 222 may be used instead.

Referring again to FIG. 2, charger 222 is provided with a monitoring unit 224C. Monitoring unit 224C includes various sensors that detect a state (e.g., a voltage, a current and a temperature) of charger 222, and outputs the detection results to ECU 250. Based on the output of monitoring unit 224C, ECU 250 controls charger 222. Thus, electric power output from charger 222 to battery 230 (i.e., charging power of battery 230) is adjusted.

Figure 5:
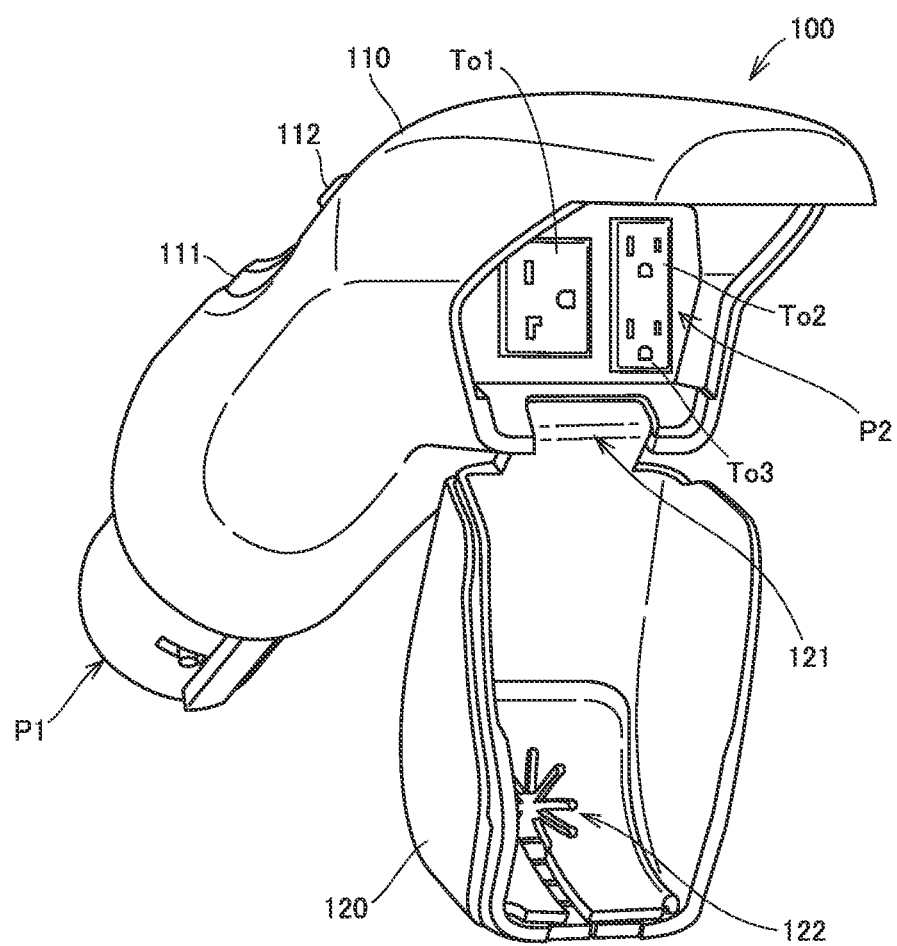
FIG. 5 shows an outer appearance of a discharging connector shown in FIG. 1, with a cover thereof being open.
Figure 6:
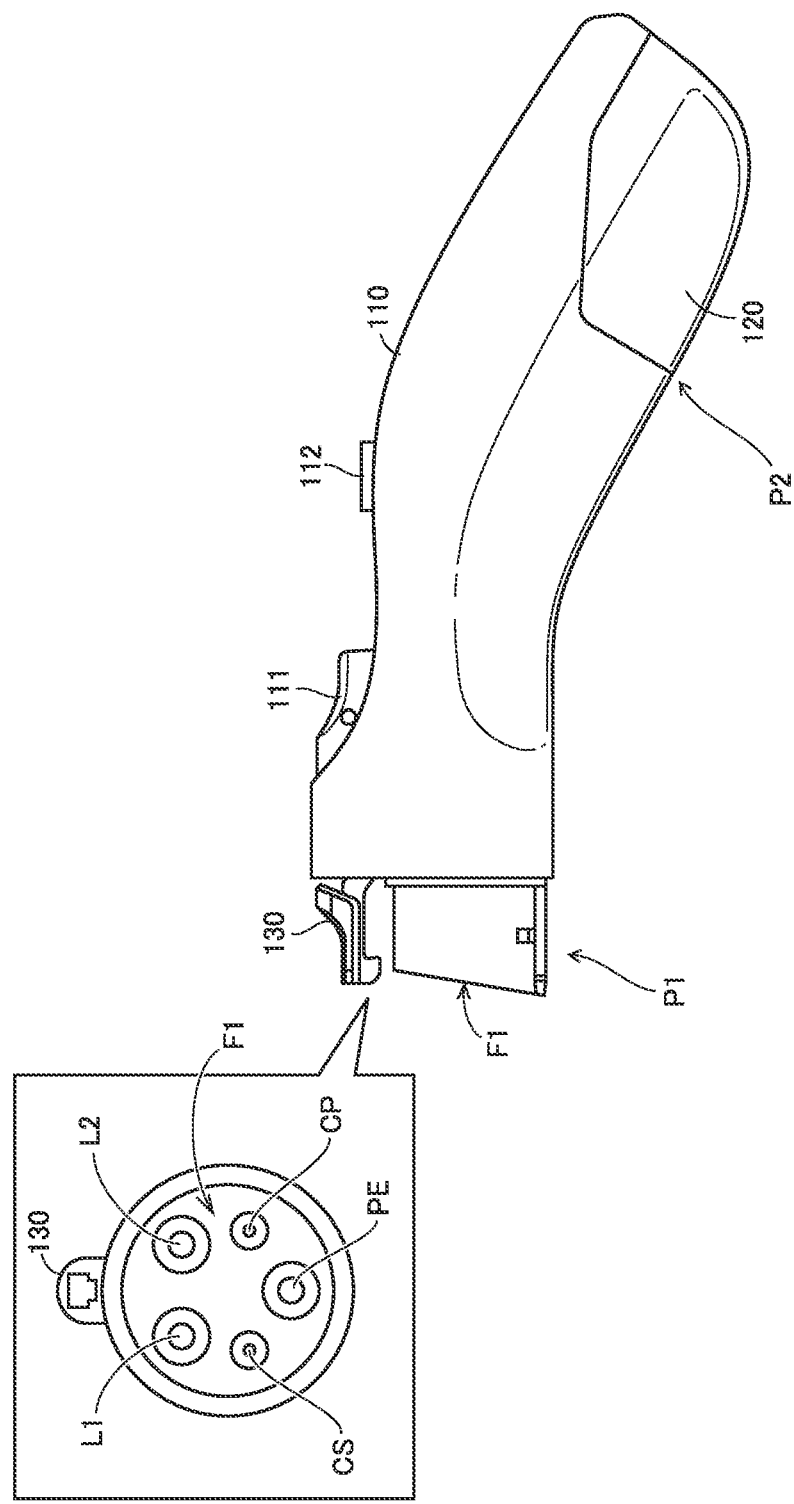
FIG. 6 shows an outer appearance of the discharging connector shown in FIG. 1, with the cover thereof being closed.

Discharging connector 100 shown in FIG. 1 corresponds to a portion of the coupling system for discharging that is connected to inlet 210. A structure of discharging connector 100 will be described below with reference to FIGS. 5 and 6. FIG. 5 shows an outer appearance of discharging connector 100, with a cover 120 being open. FIG. 6 shows an outer appearance of discharging connector 100, with cover 120 being closed.

Referring to FIGS. 5 and 6, discharging connector 100 includes first end P1 and second end P2. First end P1 and second end P2 are located at both ends of a main body portion 110 of discharging connector 100. First end P1 is configured to be connectable to inlet 210 of vehicle 200. Second end P2 includes a first electrical outlet To1, a second electrical outlet To2 and a third electrical outlet To3.

Discharging connector 100 further includes cover 120 configured to be capable of opening and closing second end P2. Cover 120 is pivotably attached to main body portion 110 of discharging connector 100. Specifically, cover 120 is attached to main body portion 110 through a rotating mechanism 121 (e.g., hinge). Cover 120 covers second end P2 in the closed state, and exposes second end P2 in the open state. Cover 120 is provided with a hole 122 through which a cord (e.g., power cord 320 shown in FIG. 1) is inserted. Hole 122 includes a central hole, and a plurality of slits extending radially around the central hole. Hole 122 receives the plurality of cords. By inserting three cords into hole 122, cover 120 can be closed even in a state where a plug of each cord is inserted into each of first to third electrical outlets To1 to To3. In the closed state of cover 120 (see FIG. 6), exposure of first to third electrical outlets To1 to To3 to rain and wind is suppressed. Cover 120 has a waterproofing property. Main body portion 110 and cover 120 may be subjected to waterproofing treatment. A seal member may be provided at a portion of cover 120 that comes into contact with main body portion 110 when cover 120 is closed. A structure for protecting first to third electrical outlets To1 to To3 against rainfall may be a structure defined in 6.12 of the standard "JIS C8303:2007".

As shown in FIG. 6, first end P1 includes a connector terminal at an end face F1. End face F1 of first end P1 of discharging connector 100 corresponds to a surface (connection surface) connected to inlet 210 of vehicle 200 (FIG. 2). The connector terminal provided at end face F1 includes a terminal L1, a terminal L2, a terminal PE, a terminal CS, and a terminal CP.

Terminals L1 and L2 correspond to two terminals to which AC power is input from vehicle 200. Terminal L1 is a HOT-side terminal, and terminal L2 is a COLD-side terminal. Terminals L1 and L2 at end face F1 correspond to examples of "first input terminal" and "second input terminal" according to the present disclosure, respectively. Hereinafter, terminal L1 will also be denoted as "AC1", and terminal L2 will also be denoted as "AC2". Terminal PE corresponds to a ground terminal (hereinafter, also denoted as "GND"). Terminal CS corresponds to a terminal (hereinafter, also denoted as "PISW") for detection (proximity detection) of a state (connected state/fitted state/non-fitted state) of discharging connector 100 and inlet 210. Hereinafter, the state of discharging connector 100 and inlet 210 will also be referred to as "connector state". Terminal CS outputs, to the vehicle 200 side, a potential signal (hereinafter, also referred to as "PISW signal") indicating the connector state. Terminal CS and the PISW signal correspond to examples of "detection terminal" and "connector signal" according to the present disclosure, respectively. Terminal CP corresponds to a terminal (hereinafter, also denoted as "CPLT") for a control pilot (CPLT) signal defined in, for example, the standard "IEC/TS 62763:2013". The CPLT signal is a pulse width modulation (PWM) signal used for communication between vehicle 200 and discharging connector 100.

Inlet 210 includes terminals corresponding to the above-described terminals (terminals L1, L2, PE, CS, and CP) of discharging connector 100. Hereinafter, in order to clarify the correspondence relationship between the terminals of discharging connector 100 and the terminals of inlet 210, the terminals of inlet 210 corresponding to terminals L1, L2, PE, CS, and CP of discharging connector 100 will also be referred to as "AC1", "AC2", "GND", "PISW", and "CPLT", respectively. In a state where discharging connector 100 and inlet 210 are fitted to each other, AC1, AC2, GND, PISW, and CPLT provided at first end P1 of discharging connector 100 are electrically connected to AC1, AC2, GND, PISW, and CPLT of inlet 210, respectively. The terminals of discharging connector 100 and the structure for fitting to inlet 210 may conform to, for example, Type 1 defined in the standard "IEC62196-2:2011".

Discharging connector 100 further includes an unlatch button 111, a discharging start switch 112 and a latch 130.

Unlatch button 111 has the function of unlatching discharging connector 100 from inlet 210, and causing vehicle 200 (e.g., ECU 250) to sense the connector state (connected state/fitted state/non-fitted state). Latch 130 is configured to engage with inlet 210 and fix (latch) discharging connector 100 to inlet 210. For example, when a tip of latch 130 is caught in a recessed portion formed in inlet 210, discharging connector 100 is latched. Latch 130 works in conjunction with unlatch button 111. When unlatch button 111 is pressed by the user, latching is released.

When the user inserts discharging connector 100 into inlet 210 and fits discharging connector 100 and inlet 210 to each other without pressing unlatch button 111, discharging connector 100 and inlet 210 are fixed by latch 130, with discharging connector 100 and inlet 210 being electrically connected to each other. This connector state corresponds to "connected state". In the connected state, discharging connector 100 is inserted into inlet 210, and all terminals of discharging connector 100 and inlet 210 are electrically connected, and discharging connector 100 is latched. When the user presses unlatch button 111 in the connected state, fixation by latch 130 is released. This connector state corresponds to "fitted state". In the fitted state, although discharging connector 100 is inserted into inlet 210 and all terminals of discharging connector 100 and inlet 210 are electrically connected, discharging connector 100 is not latched. When the user pulls out discharging connector 100 from inlet 210 in the fitted state, the connector state enters "non-fitted state". The non-fitted state is a state other than the connected state and the fitted state. When the connector state is the connected state or the fitted state, traveling of vehicle 200 is prohibited by ECU 250.

Discharging start switch 112 has the function of changing the PISW signal (signal of terminal CS) to thereby cause vehicle 200 (e.g., ECU 250) to sense the start of discharging. In the present embodiment, the PISW signal is the potential signal. Details of the PISW signal will be described below (see FIG. 13).

First end P1 and second end P2 of discharging connector 100 shown in FIG. 1 are connected to each other by a single-phase three-line-type wiring L10. Single-phase three-line-type wiring L10 includes a voltage line L11, a voltage line L12 and a neutral line L13. Voltage line L11, voltage line L12 and neutral line L13 correspond to examples of "first voltage line", "second voltage line" and "neutral line" according to the present disclosure, respectively. Voltage lines L11 and L12 and neutral line L13 are provided to extend from first end P1 to second end P2, and connect first end P1 and second end P2 to each other. Second end P2 is configured to output electric power of AC 100 V and AC 200 V through voltage lines L11 and L12 and neutral line L13. A manner of connection between single-phase three-line-type wiring L10 and first to third electrical outlets To1 to To3 will be described below (see FIG. 8).

Figure 7:
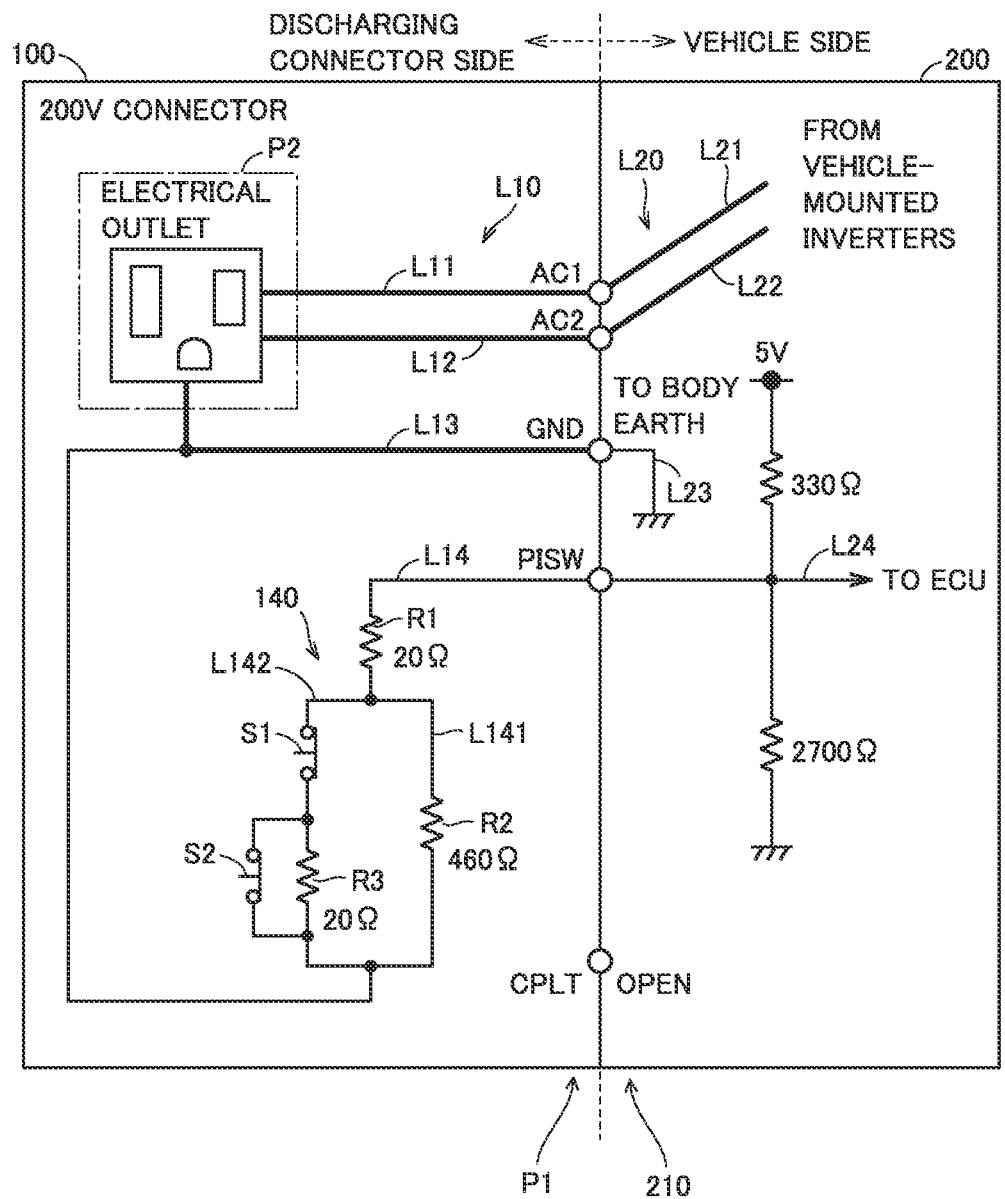
FIG. 7 shows a schematic circuit configuration of a 200V connector and a vehicle inlet shown in FIG. 1.

FIG. 7 shows a schematic circuit configuration of discharging connector 100 and inlet 210. Referring to FIG. 7 together with FIGS. 2 and 6, in discharging connector 100, voltage line L11, voltage line L12 and neutral line L13 are connected to AC1, AC2 and GND at first end P1, respectively. Single-phase three-line-type wiring L10 (i.e., voltage lines L11 and L12 and neutral line L13) of discharging connector 100 is connected to a single-phase three-line-type wiring L20 (i.e., voltage lines L21 and L22 and a neutral line L23) of vehicle 200 through AC1, AC2 and GND. In vehicle 200, voltage line L21, voltage line L22 and neutral line L23 are connected to AC1, AC2 and GND of inlet 210, respectively. AC1 and AC2 of inlet 210 correspond to examples of "first output terminal" and "second output terminal" according to the present disclosure, respectively. In vehicle 200, voltage lines L21 and L22 are supplied with AC power from the vehicle-mounted inverters (e.g., AC inverters 221A and 221B shown in FIG. 2). The AC power supplied from the vehicle-mounted inverters to voltage lines L21 and L22 is then transmitted to voltage lines L11 and L12 through AC1 and AC2. In addition, in vehicle 200, GND of inlet 210 is grounded to the vehicle body through neutral line L23 (body earth). Although FIG. 7 shows only one electrical outlet, discharging connector 100 includes three electrical outlets (first to third electrical outlets To1 to To3 shown in FIG. 5).

Figure 8:
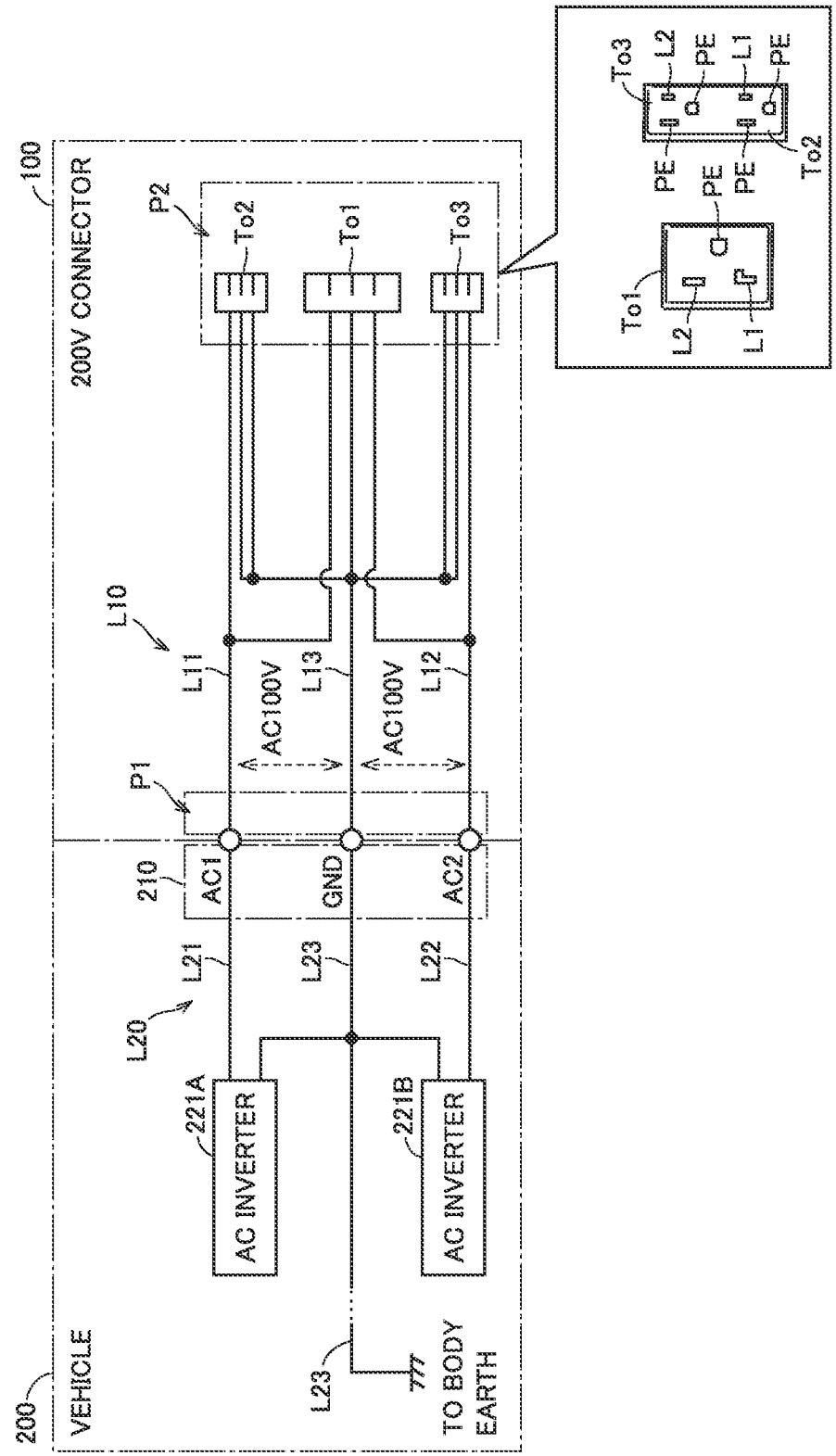
FIG. 8 shows a manner of connection between single-phase three-line-type wirings in the 200V connector and a vehicle shown in FIG. 1.

FIG. 8 shows a manner of connection between single-phase three-line-type wirings L10 and L20 in discharging connector 100 and vehicle 200. Referring to FIG. 8 together with FIGS. 2, 5 and 7, AC1 and GND of inlet 210 are connected to AC inverter 221A through voltage line L21 and neutral line L23, respectively. AC2 and GND of inlet 210 are connected to AC inverter 221B through voltage line L22 and neutral line L23, respectively. GND of inlet 210 is grounded to the body of vehicle 200 through neutral line L23 (body earth).

Each of AC inverters 221A and 221B is configured to receive the DC power supplied from battery 230 (FIG. 2) and output the AC power to the inlet 210 side. Between AC1 and GND in inlet 210, first AC power is output from battery 230 through AC inverter 221A. Between AC2 and GND in inlet 210, second AC power is output from battery 230 through AC inverter 221B.

The electric power (e.g., the above-described first AC power and second AC power) is input to first end P1 of discharging connector 100 from inlet 210 connected to first end P1. The first AC power and the second AC power are input from inlet 210 to first end P1, and is transmitted through voltage lines L11 and L12 and neutral line L13 to second end P2. Second end P2 outputs the first AC power and the second AC power to first to third electrical outlets To1 to To3 through voltage lines L11 and L12 and neutral line L13. In the present embodiment, the first AC power applies a voltage of AC 100 V between voltage line L11 and neutral line L13, and the second AC power applies a voltage of AC 100 V between voltage line L12 and neutral line L13. As to discharging connector 100, electrical outlet terminals (receptacle terminals) electrically connected to voltage line L11, voltage line L12 and neutral line L13 are denoted as "L1", "L2" and "PE", respectively.

As shown in FIG. 8, first electrical outlet To1 includes L1 (first voltage terminal), L2 (second voltage terminal) and PE (ground terminal). Second electrical outlet To2 includes one L1 (voltage terminal) and two PEs (ground terminals). Third electrical outlet To3 includes one L2 (voltage terminal) and two PEs (ground terminals). First electrical outlet To1 outputs AC 200 V between L1 and L2. Second electrical outlet To2 outputs AC 100 V between L1 and PE. Third electrical outlet To3 outputs AC 100 V between L2 and PE. First electrical outlet To1 may be an electrical outlet for single-phase AC 200 V having a rated voltage of 250 V and a rated current of 20 A. Each of second electrical outlet To2 and third electrical outlet To3 may be an electrical outlet for single-phase AC 100 V having a rated voltage of 125 V and a rated current of 15 A.

As described above, AC 100 V/AC 200 V can be output by single-phase three-line-type wiring L10. For example, when a driving voltage of electrical device 310 shown in FIG. 1 is AC 200 V, electrical device 310 can be driven by connecting power cord 320 to first electrical outlet To1. When the driving voltage of electrical device 310 shown in FIG. 1 is AC 100 V, electrical device 310 can be driven by connecting power cord 320 to second electrical outlet To2 or third electrical outlet To3. A plurality of types of electrical devices having different driving voltages can also be driven by using a plurality of electrical outlets simultaneously.

Referring again to FIG. 7 together with FIGS. 2 and 6, in vehicle 200, a reference voltage is applied between the vehicle body (ground) and a signal line L24, and signal line L24 is connected to PISW. The PISW signal (PISW potential) is input to ECU 250 through signal line L24. When first end P1 of discharging connector 100 and inlet 210 are electrically connected to each other, a closed circuit (closed system) is formed such that PISW and GND are connected to each other with a circuit of discharging connector 100 (including a detection circuit 140 described below) interposed therebetween. Thus, the potential of PISW changes. Even if discharging connector 100 does not include a power supply, the PISW signal is generated by the above-described closed circuit. ECU 250 can determine the connector state based on the PISW signal (PISW potential).

In discharging connector 100, a signal line L14 connected to PISW is connected to neutral line L13 with detection circuit 140 interposed therebetween. Detection circuit 140 is a circuit (proximity detection circuit) for determining whether discharging connector 100 is in the connected state, in the fitted state or in the non-fitted state. Detection circuit 140 includes electric resistances R1, R2 and R3, and switches S1 and S2. Signal line L14 extends from PISW through electric resistance R1 and branches off into two branch lines L141 and L142, and branch lines L141 and L142 join to be connected to neutral line L13. Electric resistance R2 is arranged on branch line L141, and electric resistance R3 and switch S1 are arranged on branch line L142. Electric resistance R2 and electric resistance R3 are arranged in parallel. Electric resistance R3 and switch S1 are arranged in series. Switch S2 is arranged in parallel with electric resistance R3.

Switches S1 and S2 are opened and closed in conjunction with unlatch button 111 and discharging start switch 112 (FIGS. 5 and 6) of discharging connector 100, respectively. Switch S1 is in the closed state (conduction state) when unlatch button 111 is OFF, and is in the open state (cut-off state) when unlatch button 111 is ON. Switch S2 is in the closed state (conduction state) when discharging start switch 112 is OFF, and is in the open state (cut-off state) when discharging start switch 112 is ON. In the present embodiment, discharging start switch 112 is ON while the user is pressing discharging start switch 112, and discharging start switch 112 is turned off when the user stops pressing discharging start switch 112. When the user does not operate unlatch button 111 and discharging start switch 112, switches S1 and S2 are both in the closed state. Namely, each of switches S1 and S2 corresponds to a normally-on switch.

When switches S1 and S2 enter the open state, a resistance value (combined resistance) of detection circuit 140 becomes larger than that when switches S1 and S2 are in the closed state, which causes the potential of PISW to rise. ECU 250 can determine the state of each of switches S1 and S2 (and in turn, the state of each of unlatch button 111 and discharging start switch 112) based on the PISW signal (PISW potential).

In discharging connector 100 shown in FIGS. 5 and 6, unlatch button 111 functions as a switch for stopping discharging from vehicle 200, and discharging start switch 112 functions as a switch for starting discharging from vehicle 200. When the user performs a prescribed operation on discharging start switch 112, with the connector state being in the connected state, vehicle 200 (ECU 250) recognizes the start of discharging and starts discharging. In the present embodiment, when the user turns on discharging start switch 112 twice, discharging is started. When unlatch button 111 is pressed during discharging and the connector state enters the fitted state or the non-fitted state, vehicle 200 (ECU 250) recognizes the stop of discharging and stops discharging.

Figure 9:
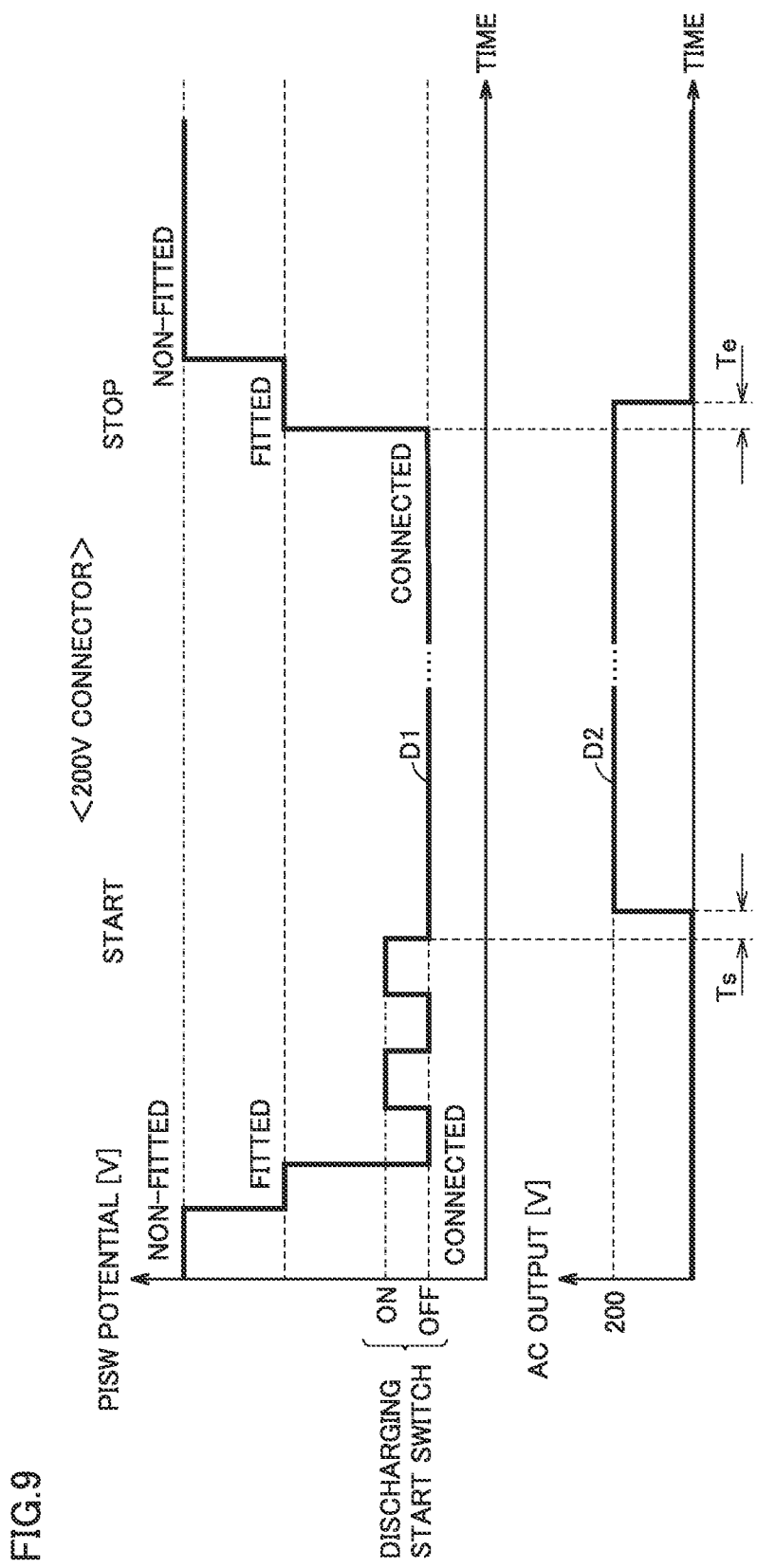
FIG. 9 is a time chart showing a sequence of start (start of discharging) and stop (stop of discharging) of the 200V connector shown in FIG. 1.

FIG. 9 is a time chart showing a sequence of start (start of discharging) and stop (stop of discharging) of discharging connector 100. In FIG. 9, a line D1 indicates the potential of PISW, and a line D2 indicates the AC power output from inlet 210 to the discharging connector 100 side.

Referring to FIG. 9 together with FIGS. 5 to 8, when the user inserts discharging connector 100 into inlet 210 while the user is pressing unlatch button 111, the connector state is switched from the non-fitted state to the fitted state and the potential of PISW falls. Thereafter, when the user stops pressing unlatch button 111, the connector state is switched from the fitted state to the connected state and the potential of PISW further falls. When a prescribed time period (e.g., 500 ms) has elapsed since the connector state entered the connected state, the operation of discharging start switch 112 becomes effective. Then, when the user turns on discharging start switch 112, the potential of PISW rises. Thereafter, when the user returns discharging start switch 112 to the OFF state, the potential of PISW also returns. When the user operates discharging start switch 112 in the order shown in FIG. 9, i.e., in the order of ON, OFF, ON, and OFF, with the connector state being in the connected state, ECU 250 (FIG. 2) recognizes the start of discharging based on the potential of PISW, and starts discharging. In order to suppress malfunction caused by noise, the recognition of discharging start switch 112 by ECU 250 becomes effective when the voltage corresponding to the ON/OFF operation continues for a prescribed time period (e.g., 50 ms to 3000 ms).

Discharging from vehicle 200 is performed by ECU 250. Specifically, ECU 250 controls charging and discharging device 220 (FIG. 2) such that the above-described first AC power and second AC power are output from inlet 210 to the discharging connector 100 side. During discharging, SMR 231 (FIG. 2) is controlled to be in the closed state. A period Ts from the discharging start operation to the start of discharging can be arbitrarily set. ECU 250 may perform a prescribed process (e.g., pre-discharging inspection such as disconnection check) in period Ts. SMR 231 may be switched from the open state to the closed state in period Ts.

When unlatch button 111 is pressed during discharging, the connector state is switched from the connected state to the fitted state and the potential of PISW rises. When the connector state enters the fitted state, ECU 250 recognizes the stop of discharging based on the potential of PISW, and stops discharging. A period Te from the discharging stop operation to the stop of discharging may be a period defined in the standard "IEC61851-1".

Referring again to FIG. 7 together with FIGS. 2 and 6, the PISW signal (PISW potential) also indicates the requested voltage value of the discharging connector electrically connected to inlet 210, in addition to the connector state and the switch state described above. Specifically, inlet 210 is configured to be connectable to a plurality of types of discharging connectors. In the present embodiment, in addition to discharging connector 100 shown in FIGS. 5 to 9, a discharging connector 100A described below may also be connected to inlet 210. Discharging connector 100 and discharging connector 100A are different in requested voltage value. A requested voltage value of discharging connector 100 is 200 V, and a requested voltage value of discharging connector 100A is 100 V. Hereinafter, discharging connector 100 and discharging connector 100A are also referred to as "200V connector" and "100V connector", respectively. The 200V connector according to the present embodiment corresponds to a single-phase three-line-type connector.

Figure 10:
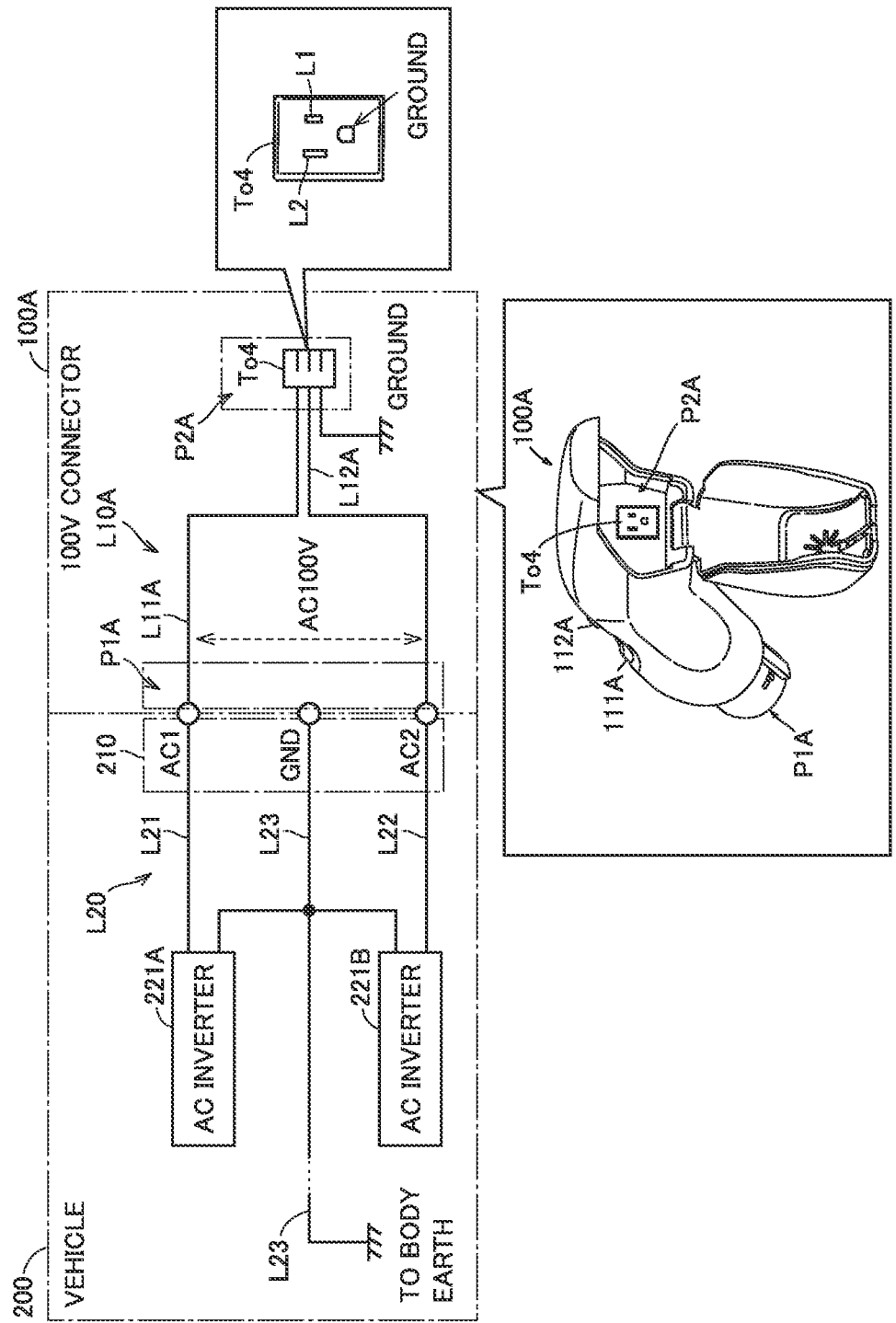
FIG. 10 is a diagram for illustrating a 100V connector connectable to the vehicle inlet shown in FIG. 1.

FIG. 10 is a diagram for illustrating the 100V connector. In the following, the 100V connector will be described, focusing on the difference from the 200V connector.

Referring to FIG. 10, an outer appearance of discharging connector 100A is almost the same as that of discharging connector 100 (FIG. 5). However, discharging connector 100A includes one electrical outlet. Discharging connector 100A includes an unlatch button 111A and a discharging start switch 112A. Discharging connector 100A includes a first end P1A connectable to inlet 210. Discharging connector 100A also includes an electrical outlet To4 at a second end P2A.

In discharging connector 100A, first end P1A and electrical outlet To4 are connected to each other by a single-phase two-line-type wiring L10A. Single-phase two-line-type wiring L10A includes a voltage line L11A and a voltage line L12A. Voltage line L11A and voltage line L12A are connected to AC1 and AC2 at first end P1A, respectively. In the present embodiment, when ECU 250 recognizes that discharging connector 100A is connected to inlet 210, ECU 250 controls AC inverters 221A and 221B such that single-phase AC power of 100 V is output between AC1 and AC2 of inlet 210.

The single-phase AC power is input from inlet 210 connected to first end P1A to first end P1A of discharging connector 100A. This single-phase AC power applies a voltage of AC 100 V between voltage line L11A and voltage line L12A. As to discharging connector 100A, electrical outlet terminals electrically connected to voltage line L11A and voltage line L12A are denoted as "L1" and "L2", respectively.

As shown in FIG. 10, electrical outlet To4 includes L1, L2 and a ground terminal. Electrical outlet To4 outputs the single-phase AC power of 100 V between L1 and L2. The ground terminal of electrical outlet To4 is grounded in discharging connector 100A. The ground terminal of electrical outlet To4 may have the same potential as that of the body of vehicle 200, or may be in a state of being insulated from the body of vehicle 200 (floating state).

Figure 11:
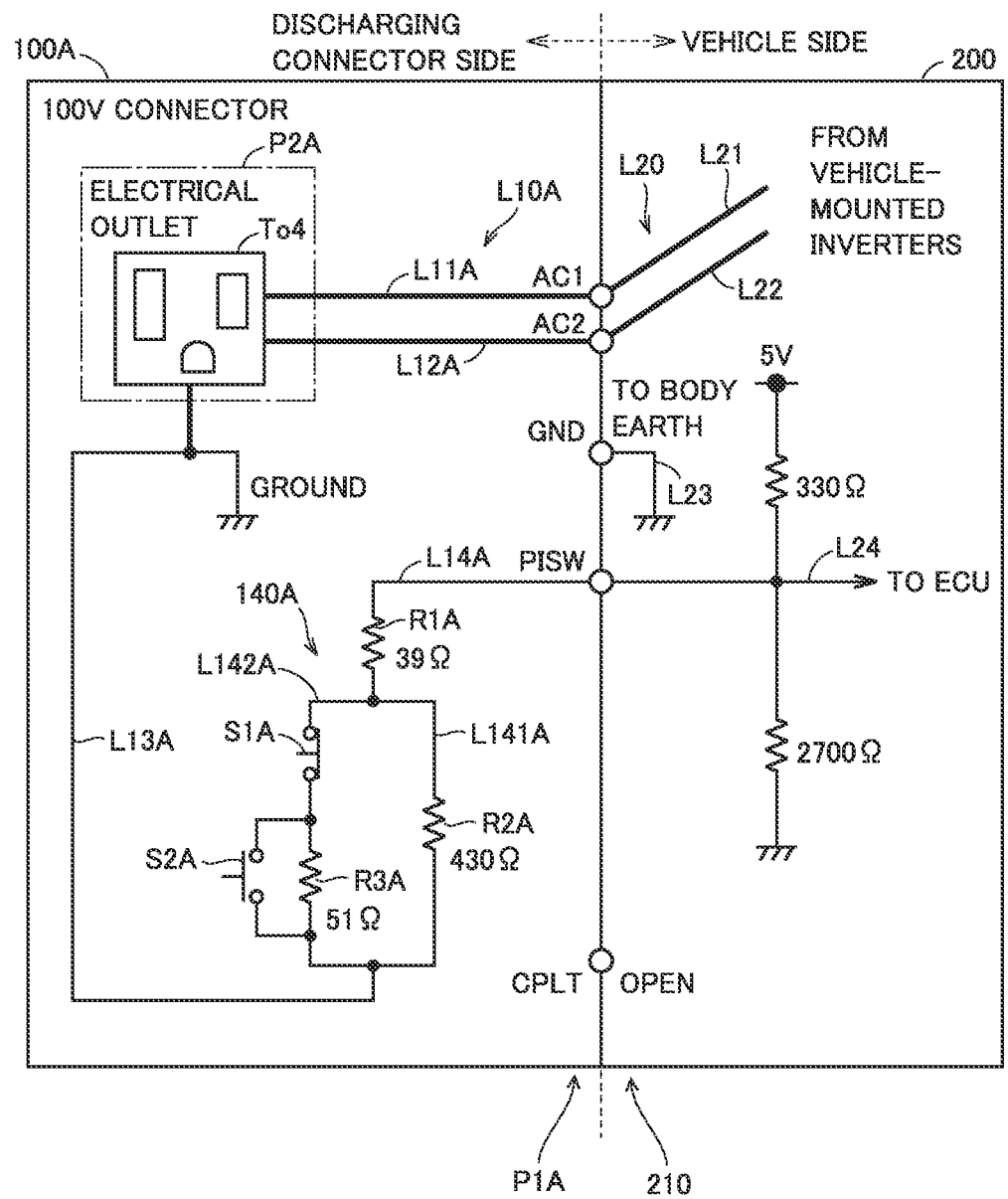
FIG. 11 shows a schematic circuit configuration of the 100V connector shown in FIG. 10.

FIG. 11 shows a schematic circuit configuration of the 100V connector. Referring to FIG. 11, in a state where discharging connector 100A is connected to inlet 210, a closed circuit is formed such that PISW and GND are connected to each other with a circuit of discharging connector 100A (including a detection circuit 140A) interposed therebetween. In vehicle 200, a reference voltage is applied between the vehicle body (ground) and PISW. Therefore, even if discharging connector 100A does not include a power supply, the PISW signal is generated by the above-described closed circuit. In addition, in discharging connector 100A, a signal line L14A connected to PISW is connected to the ground terminal of electrical outlet To4 with detection circuit 140A interposed therebetween. Detection circuit 140A includes electric resistances R1A, R2A and R3A, and switches S1A and S2A. Switches S1A and S2A are opened and closed in conjunction with unlatch button 111A and discharging start switch 112A (see FIG. 10), respectively. Signal line L14A extends from PISW through electric resistance R1A and branches off into two branch lines L141A and L142A, and branch lines L141A and L142A join to be connected to a ground line L13A. Although detection circuit 140A basically has a configuration similar to that of detection circuit 140 shown in FIG. 7, detection circuit 140A is different from detection circuit 140 in the following points.

Detection circuit 140 and detection circuit 140A are different in resistance value. As shown in FIG. 7, electric resistances R1, R2 and R3 in detection circuit 140 have resistance values of 20Ω, 460Ω and 20Ω, respectively. In contrast, as shown in FIG. 11, electric resistances R1A, R2A and R3A in detection circuit 140A have resistance values of 39Ω, 430Ω and 51Ω, respectively. Each resistance value in each of detection circuits 140 and 140A is set in accordance with a potential map M2 described below. In addition, each electric resistance included in detection circuits 140 and 140A is set at a resistance value different from that of each electric resistance in a charging connector defined in the standard "IEC61851-1:2010 Annex B". Thus, ECU 250 can distinguish between the charging connector and the discharging connector based on the PISW signal (PISW potential).

In detection circuit 140A, switch S1A is a normally-on switch, and switch S2A is a normally-off switch. Switch S2A is in the closed state when discharging start switch 112A is ON, and is in the open state when discharging start switch 112A is OFF.

Figure 12:
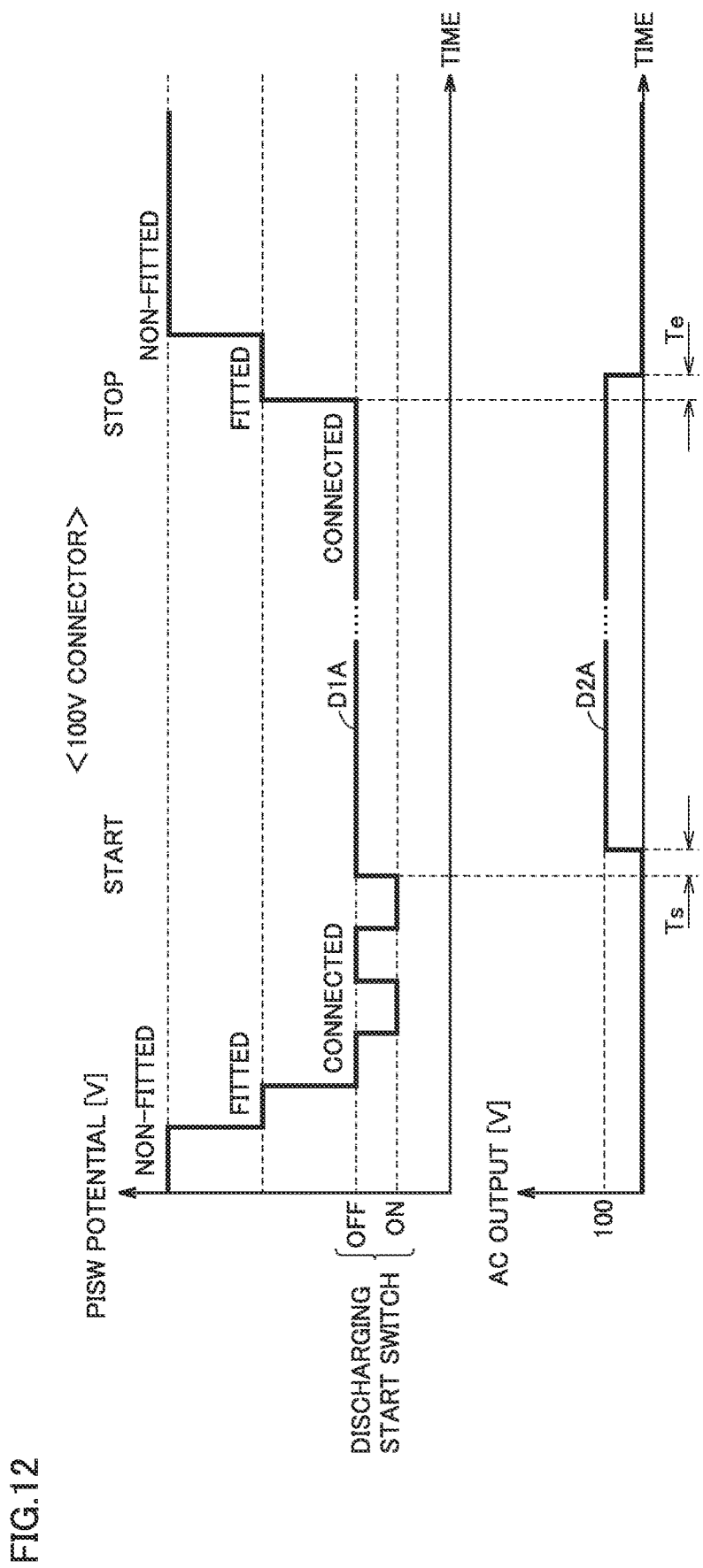
FIG. 12 is a time chart showing a sequence of start (start of discharging) and stop (stop of discharging) of the 100V connector shown in FIG. 10.

FIG. 12 is a time chart showing a sequence of start (start of discharging) and stop (stop of discharging) of the 100V connector. In FIG. 12, a line D1A indicates the potential of PISW, and a line D2A indicates the AC power output from inlet 210 to the discharging connector 100A side.

Referring to FIG. 12 together with FIGS. 10 and 11, the sequence of discharging connector 100A is basically similar to the sequence of discharging connector 100 shown in FIG. 9. However, when the user turns on discharging start switch 112A, the potential of PISW falls. When the user returns discharging start switch 112A to the OFF state, the potential of PISW also returns. When the user operates discharging start switch 112A in the order shown in FIG. 12, i.e., in the order of ON, OFF, ON, and OFF, with the connector state being in the connected state, ECU 250 (FIG. 2) recognizes the start of discharging based on the potential of PISW, and starts discharging.

Figure 13:
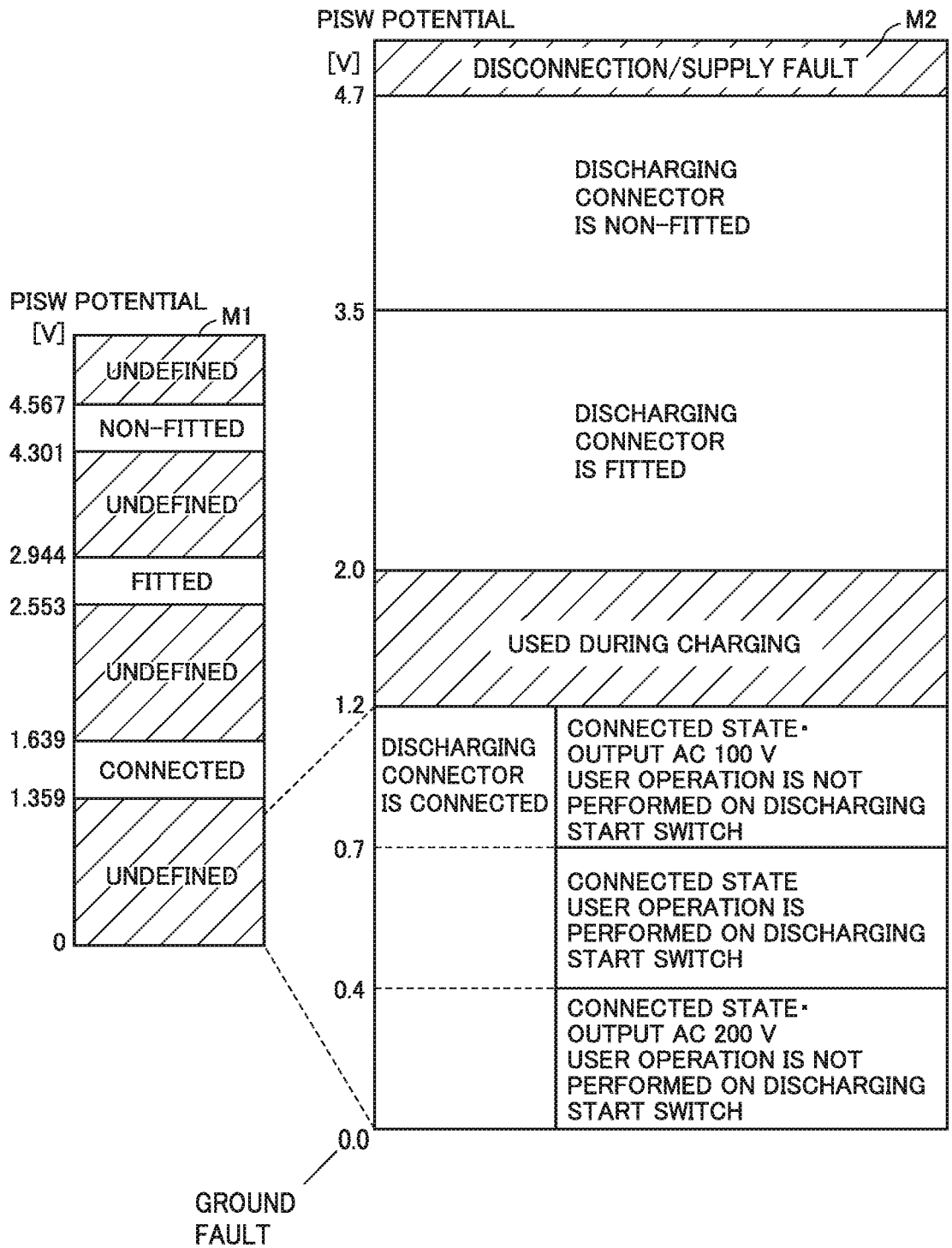
FIG. 13 is a diagram for illustrating a PISW signal (connector signal).

FIG. 13 is a diagram for illustrating the PISW signal (PISW potential). Referring to FIG. 13, a potential map M1 about the PISW potential indicates a determination value for each potential range defined in the charging standard "IEC61851-1". In the range of 0 to 4.7 V, the connector states such as the connected state, the fitted state and the non-fitted state are defined as the determination values for the potential range of 1.359 to 1.639 V, the potential range of 2.553 to 2.944 V, and the potential range of 4.301 to 4.567 V, respectively. The potential ranges other than these are undefined.

Potential map M2 about the PISW potential is a control map used for control, and is stored in storage device 253 of ECU 250 shown in FIG. 2. In potential map M2, the connector state, the switch state and the requested voltage value of the discharging connector are set for each potential range. When the discharging connector is electrically connected to inlet 210, ECU 250 can use potential map M2 to obtain the connector state, the switch state and the requested voltage value of the discharging connector based on the PISW signal. ECU 250 can also determine whether the discharging connector is electrically connected to inlet 210, based on the PISW signal.

In potential map M2, a potential range indicating that the discharging connector is in the connected state (hereinafter, also referred to as "connected range") is assigned to the potential range of 0.0 to 1.2 V. A potential range used during charging (charging range) is assigned to the potential range of 1.2 to 2.0 V. A potential range indicating that the discharging connector is in the fitted state (hereinafter, also referred to as "fitted range") is assigned to the potential range of 2.0 to 3.5 V. A potential range indicating that the discharging connector is in the non-fitted state (hereinafter, also referred to as "non-fitted range") is assigned to the potential range of 3.5 to 4.7 V.

In potential map M2, the connected range is assigned to the potential range of 0.0 to 1.2 V that is not defined in the charging standard "IEC61851-1". Thus, it is easier for ECU 250 to distinguish between the charging connector and the discharging connector. The connected range is further divided into three potential ranges (0.0 to 0.4 V/0.4 to 0.7 V/0.7 to 1.2 V) described below.

A potential range indicating that the requested voltage value of the discharging connector connected to inlet 210 is 200 V (hereinafter, also referred to as "200V range") is assigned to the potential range of 0.0 to 0.4 V. The PISW potential belonging to the 200V range means that the discharging connector connected to inlet 210 is a 200V connector. A potential range indicating that the requested voltage value of the discharging connector connected to inlet 210 is 100 V (hereinafter, also referred to as "100V range") is assigned to the potential range of 0.7 to 1.2 V. The PISW potential belonging to the 100V range means that the discharging connector connected to inlet 210 is a 100V connector. Since the 100V connector (FIG. 11) and the 200V connector (FIG. 7) are different in resistance value, the 100V connector (FIG. 11) and the 200V connector (FIG. 7) are also different in PISW potential when each connector is connected to inlet 210. Each of the 100V range and the 200V range also indicates that the discharging start switch of the discharging connector is OFF, in addition to the requested voltage value of the discharging connector connected to inlet 210.

A potential range indicating that the discharging start switch is ON (hereinafter, also referred to as "discharging start range") is assigned to the potential range of 0.4 to 0.7 V. Since switch S2 (FIG. 7) that works in conjunction with discharging start switch 112 is a normally-on switch in the 200V connector, the potential of PISW rises when discharging start switch 112 is switched from the OFF state to the ON state. Since switch S2A (FIG. 11) that works in conjunction with discharging start switch 112A is a normally-off switch in the 100V connector, the potential of PISW falls when discharging start switch 112A is switched from the OFF state to the ON state.

Figure 14:
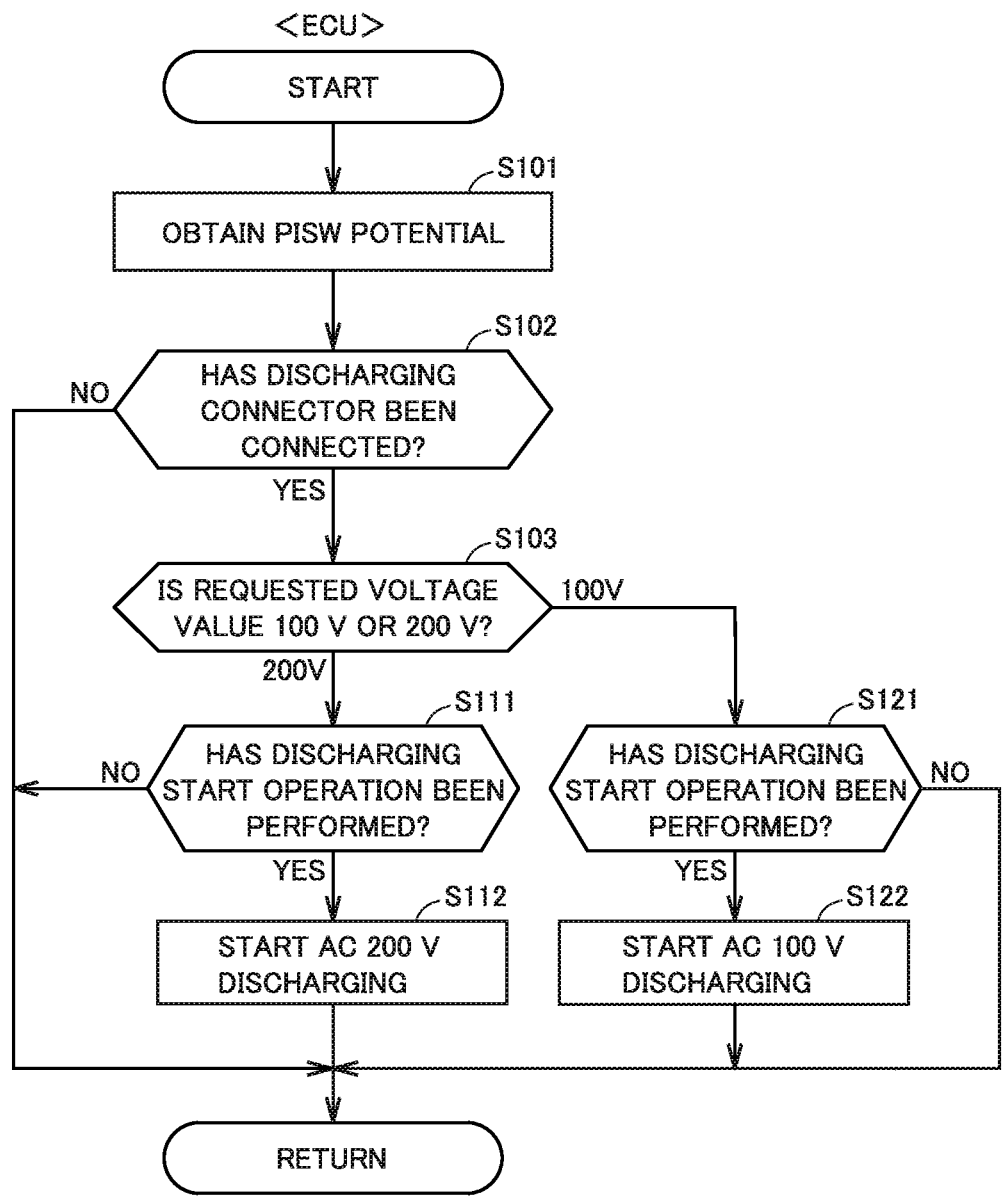
FIG. 14 is a flowchart showing a power feeding method according to the embodiment of the present disclosure.

FIG. 14 is a flowchart showing a process related to the start of discharging performed by ECU 250. The process shown in this flowchart is repeatedly performed during a halt of vehicle 200 (excluding during charging and during discharging).

Referring to FIG. 14 together with FIGS. 1 to 13, in S101, ECU 250 obtains the PISW signal (PISW potential). Next, in S102, ECU 250 determines whether the discharging connector has been connected to inlet 210, based on the PISW signal. When the connector state enters the connected state, determination of YES is made in S102 and the process proceeds to S103. In S103, ECU 250 determines whether the requested voltage value of the discharging connector connected to inlet 210 is 100 V or 200 V.

ECU 250 uses potential map M2 shown in FIG. 13 to obtain the state (e.g., connector state) of inlet 210 and the information (e.g., switch state and requested voltage value) about the discharging connector connected to inlet 210, based on the PISW signal obtained in S101. ECU 250 can determine the connector state (non-fitted state/fitted state/connected state), based on whether the PISW potential belongs to the non-fitted range, the fitted range or the connected range. ECU 250 can also determine whether the discharging start switch has been operated by the user, based on whether the PISW potential belongs to the discharging start range. Furthermore, ECU 250 can determine the requested voltage value (100 V/200 V) of the discharging connector, based on whether the PISW potential belongs to the 100V range or the 200V range. The PISW potential belonging to the 200V range means that the discharging connector connected to inlet 210 is a single-phase three-line-type connector (200V connector shown in FIGS. 5 to 9). When the requested voltage value of the discharging connector connected to inlet 210 is 200 V, ECU 250 determines that the discharging connector is a single-phase three-line-type connector.

When it is determined in S103 that the requested voltage value of the discharging connector is 200 V, ECU 250 determines in S111 whether the AC 200 V discharging start operation (discharging start switch operation in the order of ON, OFF, ON, and OFF shown in FIG. 9) has been performed by the user. When the AC 200 V discharging start operation has been performed by the user (YES in S111), ECU 250 outputs the single-phase AC power of 200 V from inlet 210 to the 200V connector side in S112. Specifically, ECU 250 controls AC inverters 221A and 221B such that the single-phase AC power of 200 V is output between AC1 and AC2 of inlet 210 shown in FIG. 8. In the present embodiment, each of AC inverters 221A and 221B applies an AC voltage (AC 100 V) corresponding to a half of the requested voltage value, thereby applying AC 200 V between AC1 and AC2. Thus, the single-phase AC power of 200 V, 100 V and 100 V are output to first electrical outlet To1, second electrical outlet To2 and third electrical outlet To3 of the 200V connector, respectively.

When it is determined in S103 that the requested voltage value of the discharging connector is 100 V, ECU 250 determines in S121 whether the AC 100 V discharging start operation (discharging start switch operation in the order of ON, OFF, ON, and OFF shown in FIG. 12) has been performed by the user. When the AC 100 V discharging start operation has been performed by the user (YES in S121), ECU 250 outputs the single-phase AC power of 100 V from inlet 210 to the 100V connector side in S122. Specifically, ECU 250 controls AC inverters 221A and 221B such that the single-phase AC power of 100 V is output between AC1 and AC2 of inlet 210 shown in FIG. 10. In the present embodiment, each of AC inverters 221A and 221B applies an AC voltage (AC 50 V) corresponding to a half of the requested voltage value, thereby applying AC 100 V between AC1 and AC2. Thus, the single-phase AC power of 100 V is output to electrical outlet To4 of the 100V connector. However, the present disclosure is not limited to the foregoing. ECU 250 may cause only AC inverter 221A to apply AC 100 V between AC1 and AC2, and bring AC inverter 221B into a voltage non-application state (conduction state).

When discharging is started in S112 or S122 described above, a series of process shown in FIG. 14 ends. The started discharging ends when a prescribed discharging end condition is satisfied. When the prescribed discharging stop condition is satisfied, ECU 250 controls AC inverters 221A and 221B so as to stop the discharging from inlet 210 to the discharging connector. As described above, the above-described discharging stop condition is satisfied when the connector state enters the fitted state or the non-fitted state during discharging. The above-described discharging stop condition is also satisfied when the SOC of battery 230 becomes equal to or smaller than a prescribed SOC value. However, the present disclosure is not limited to the foregoing. The discharging stop condition can be arbitrarily set.

As described above, a power feeding method according to the present embodiment includes: obtaining the requested voltage value of the discharging connector connected to inlet 210 of vehicle 200 (S101); determining whether the discharging connector connected to inlet 210 is a single-phase three-line-type connector (discharging connector including voltage lines L11 and L12 and neutral line L13) (S103); and when the discharging connector connected to inlet 210 is a single-phase three-line-type connector ("200 V" in S103), applying the AC voltages between voltage line L11 and neutral line L13 and between voltage line L12 and neutral line L13 such that first electrical outlet To1 (electrical outlet connected to voltage lines L11 and L12 and neutral line L13) outputs the AC voltage (AC 200 V) corresponding to the requested voltage value, second electrical outlet To2 connected to voltage line L11 and neutral line L13 outputs the AC voltage (AC 100 V) corresponding to a half of the requested voltage value, and third electrical outlet To3 connected to voltage line L12 and neutral line L13 outputs the AC voltage (AC 100 V) corresponding to a half of the requested voltage value (S112).

According to the above-described power feeding method, it is possible to output the AC power of AC 200 V from first electrical outlet To1 and output the AC power of AC 100 V from each of second electrical outlet To2 and third electrical outlet To3, while suppressing design change of the existing vehicle.

The control map used to distinguish the discharging connector is not limited to potential map M2 shown in FIG. 13. For example, ECU 250 may detect the requested voltage value of the discharging connector by using a potential range other than the potential range of 0.0 to 1.2 V. More specifically, the connected range including the 100V range, the 200V range and the discharging start range may be assigned to any one of the potential range of 1.639 to 2.553 V, the potential range of 2.944 to 4.301 V and the potential range of 4.567 to 4.700 V, which are not defined in the charging standard "IEC61851-1".

Although the above-described embodiment provides the example of outputting AC 100 V/AC 200 V by the single-phase three-line-type wiring, the voltage output by the single-phase three-line-type wiring can be changed as appropriate. For example, AC 110 V/AC 220 V, AC 115 V/AC 230 V or AC 120 V/AC 240 V may be output by the single-phase three-line-type wiring.

The configuration of the single-phase three-line-type connector is not limited to the configuration shown in FIGS. 5 to 9. For example, third electrical outlet To3 may be omitted. In addition, cover 120 may be omitted. Furthermore, discharging start switch 112 can also be omitted. A trigger to start discharging can be arbitrarily set. For example, discharging may be started when a prescribed time period has elapsed since the connector state entered the connected state. Alternatively, discharging may be started when the user operates a switch provided in the vehicle.

Figure 15:
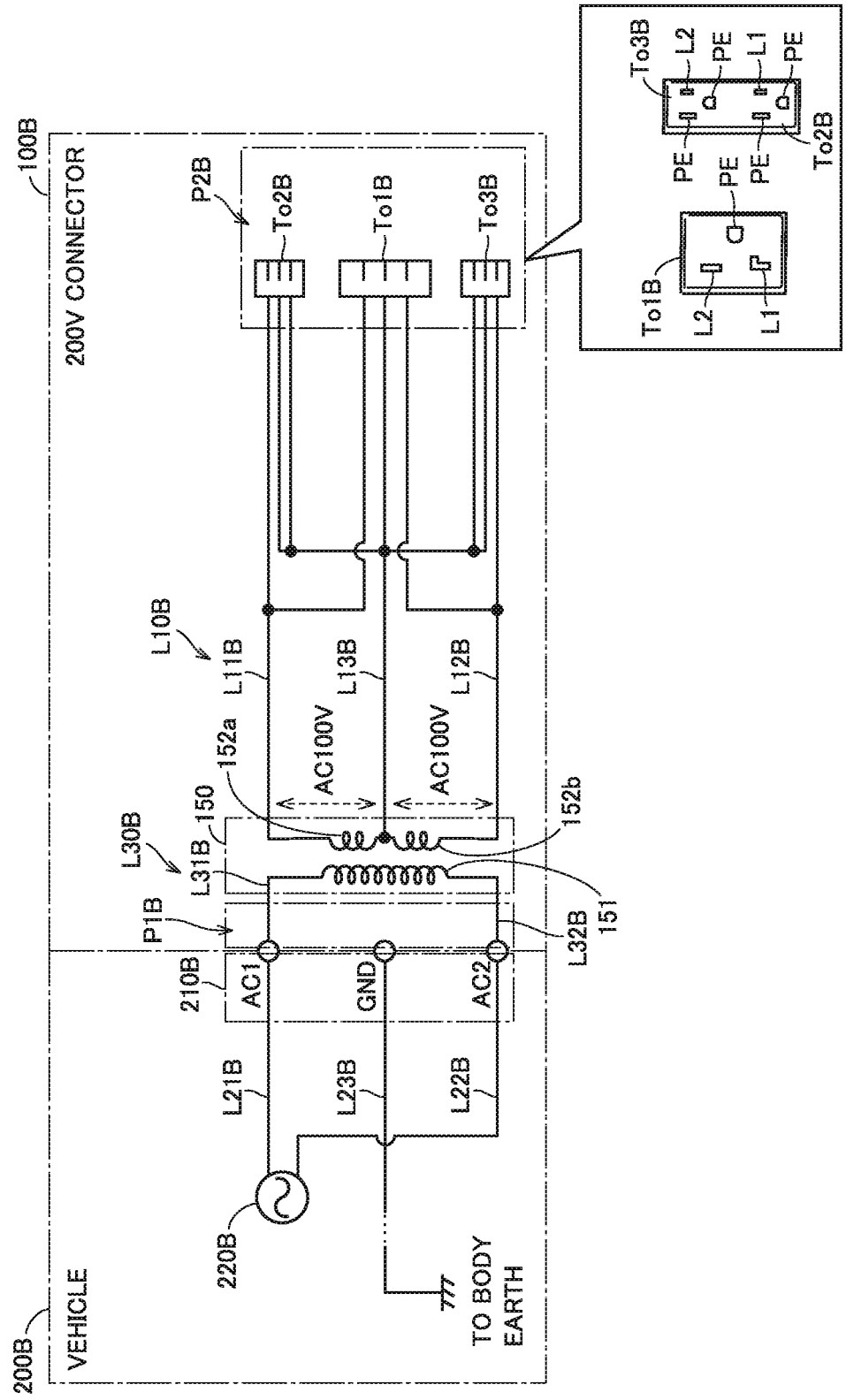
FIG. 15 shows a modification of the configuration shown in FIG. 8.

The single-phase three-line-type connector may further include a converter that converts the two lines connected to the first end into the three lines, i.e., the first voltage line, the second voltage line and the neutral line. FIG. 15 shows a modification of the configuration shown in FIG. 8.

Referring to FIG. 15, a vehicle 200B includes an inlet 210B and an AC power supply 220B. AC power supply 220B is configured to apply an AC voltage between AC1 and AC2 of inlet 210B. AC power supply 220B is electrically connected to AC1 and AC2 of inlet 210B through voltage lines L21B and L22B. GND of inlet 210B is grounded to a body of vehicle 200B through a ground line L23B (body earth). AC power supply 220B includes a vehicle-mounted battery (e.g., battery 230 shown in FIG. 2) and a power conversion circuit. The power conversion circuit of AC power supply 220B may be a vehicle-mounted charger (e.g., charger 222 shown in FIG. 4) configured to allow bidirectional power conversion, or may be a vehicle-mounted inverter (e.g., AC inverter 221 shown in FIG. 3).

Discharging connector 100B includes a converter 150 that converts a single-phase two-line-type wiring into a single-phase three-line-type wiring. In the example shown in FIG. 15, converter 150 is an insulating transformer including a primary coil 151, a secondary coil 152a and a secondary coil 152b. A single-phase two-line-type wiring L30B (two lines, i.e., voltage lines L31B and L32B) is provided on the primary side (first end P1B side) of converter 150 in discharging connector 100B. AC1 and AC2 at first end P1B are connected to voltage lines L31B and L32B, respectively. First end P1B and converter 150 are electrically connected to each other through the above-described two lines. Primary coil 151 is connected between voltage lines L31B and L32B. A single-phase three-line-type wiring L10B (three lines, i.e., voltage lines L11B and L12B and neutral line L13B) is provided on the secondary side (second end P2B side) of converter 150 in discharging connector 100B. Similarly to voltage lines L11 and L12 and neutral line L13 shown in FIG. 8, voltage lines L11B and L12B and neutral line L13B are connected to first to third electrical outlets To1B to To3B at second end P2B. Converter 150 and second end P2B are electrically connected to each other through the above-described three lines. Secondary coil 152a is connected between voltage line L11B and neutral line L13B. Secondary coil 152b is connected between voltage line L12B and neutral line L13B. For example, in converter 150, an AC voltage corresponding to a half of a voltage applied from inlet 210B to primary coil 151 is transmitted to each of secondary coils 152a and 152b. In the example shown in FIG. 15, AC 200 V is applied to primary coil 151, and AC 100 V is applied to each of secondary coils 152a and 152b.

As to discharging connector 100B, electrical outlet terminals electrically connected to voltage line L11B, voltage line L12B and neutral line L13B are denoted as "L1", "L2" and "PE", respectively. An example of terminals (receptacle terminals) in each of first to third electrical outlets To1B to To3B is as shown in FIG. 15. According to discharging connector 100B of the above-described modification, it is possible to receive the AC power from inlet 210B of vehicle 200B through the single-phase two-line system, and output the AC power to second end P2B (including first to third electrical outlets To1B to To3B) through the single-phase three-line system.

Figure 16:
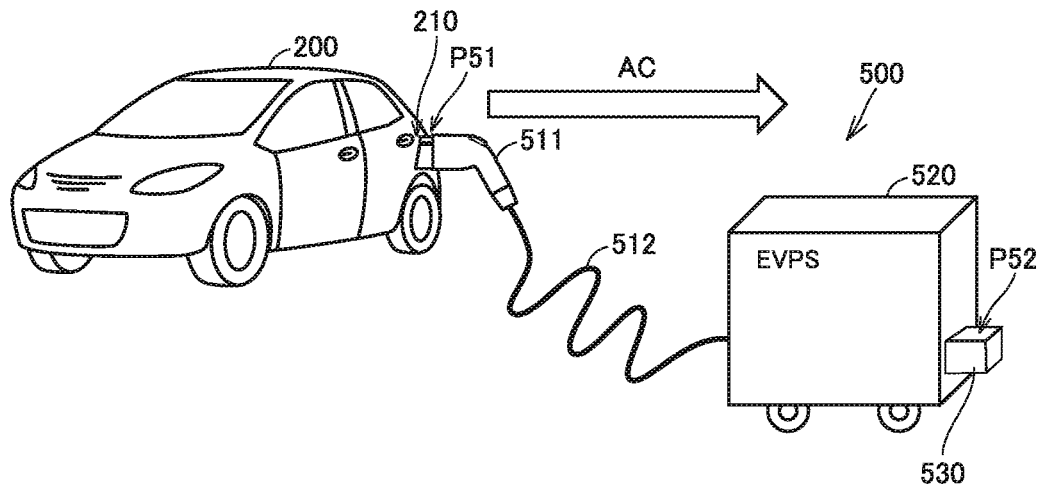
FIG. 16 shows a modification of a discharging assembly (discharging connector) shown in FIGS. 5 and 6.

In the above-described embodiment and modification, the discharging connector (e.g., discharging connector 100 or 100B) alone functions as a discharging assembly. In some embodiments, the discharging connector alone does not form the discharging assembly. FIG. 16 shows a modification of the discharging assembly (discharging connector) shown in FIGS. 5 and 6.

Referring to FIG. 16, a discharging assembly 500 includes a discharging connector 511, a housing 520 into which a circuit electrically connected to discharging connector 511 is built, and a cable 512 that connects discharging connector 511 and housing 520 to each other. Housing 520 corresponds to a main body portion of an electric vehicle power system (EVPS). The EVPS is configured to control charging and discharging of a vehicle. Housing 520 may include a display. Discharging assembly 500 includes the EVPS and a charging and discharging cable assembly. The charging and discharging cable assembly is a cable assembly that couples the vehicle to the EVPS, and includes a charging and discharging connector coupled to the vehicle. In the example shown in FIG. 16, discharging connector 511 functions as a charging and discharging connector. Cable 512 functions as a charging and discharging cable.

Figure 17:
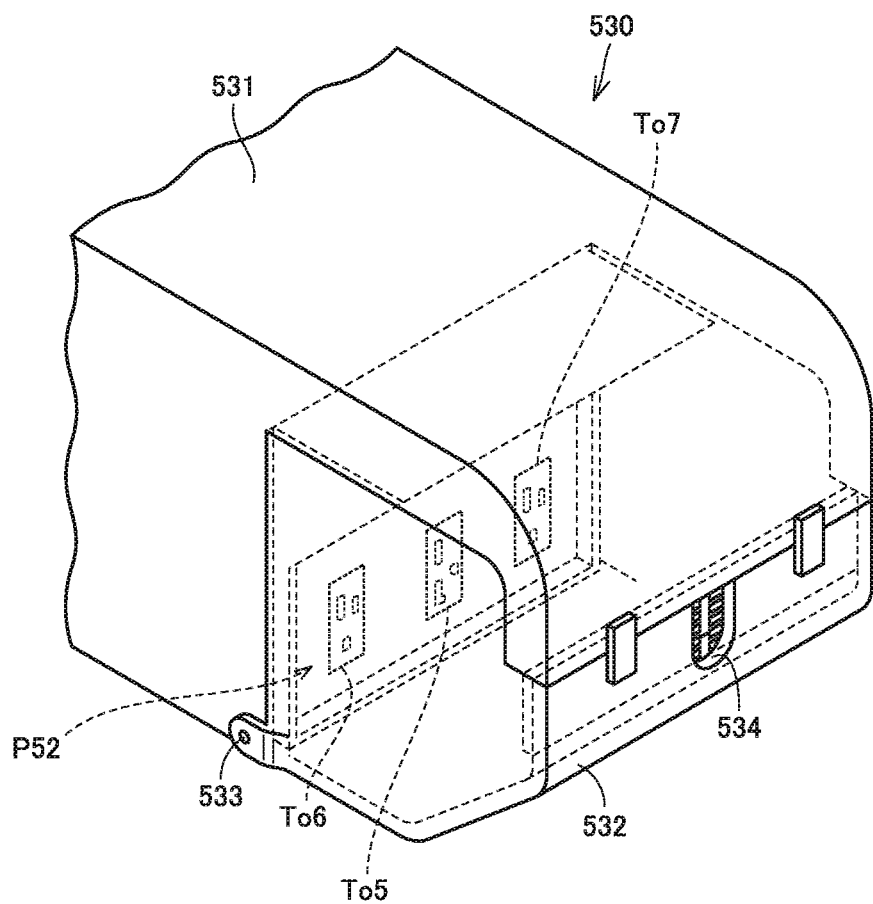
FIG. 17 shows an internal structure of an electrical outlet box shown in FIG. 16.

Discharging connector 511 includes a first end P51 of discharging assembly 500 configured to be connectable to inlet 210 of vehicle 200. Housing 520 includes an electrical outlet box 530. Electrical outlet box 530 includes a second end P52 of discharging assembly 500. In the present modification, the circuit (circuit of discharging connector 100) shown in FIGS. 7 and 8 is provided within discharging connector 511, cable 512 and housing 520. FIG. 17 shows an internal structure of electrical outlet box 530.

Referring to FIG. 17, electrical outlet box 530 includes a cover 532 that covers second end P52 in the closed state and exposes second end P52 in the open state. Second end P52 includes a first electrical outlet To5, a second electrical outlet To6 and a third electrical outlet To7. First electrical outlet To5, second electrical outlet To6 and third electrical outlet To7 have terminal structures similar to those of first electrical outlet To1, second electrical outlet To2 and third electrical outlet To3 shown in FIG. 8, respectively. However, second electrical outlet To6 and third electrical outlet To7 are arranged at distant locations. Cover 532 is attached to a main body portion 531 of electrical outlet box 530 through a rotating mechanism 533 (e.g., hinge). Cover 532 is provided with a hole 534 through which a cord (e.g., power cord 320 shown in FIG. 1) is inserted.

In discharging assembly 500 according to the modification shown in FIGS. 16 and 17 above, discharging connector 511 and housing 520 are connected to each other through cable 512, and thus, it is easier to arrange first end P51 and second end P52 at distant locations. Therefore, a degree of freedom of arrangement of the electrical outlets is higher. In addition, since a part of the discharging circuit can be housed in housing 520, it is easier to achieve a reduction in size of discharging connector 511.

In the above-described embodiment, the discharging connectors of two types of voltages (100 V/200 V) are connectable to the inlet of the vehicle. However, discharging connectors of three or more types of voltages may be connectable to the inlet of the vehicle. In addition, in the above-described embodiment, the AC power is output from the vehicle inlet to the discharging connector. However, the present disclosure is not limited to the foregoing. DC power may be supplied from the vehicle inlet to the discharging connector and DC/AC conversion may be performed in the discharging connector. In the embodiment and each modification described above, the vehicle is not limited to the BEV, and may be another xEV (e.g., PHEV or FCEV). The discharge entity including the discharging port is not limited to the vehicle, and any entity may be used. For example, the discharge entity may be a stationary power storage device.

The above-described modifications may be implemented in any combination. For example, the circuit shown in FIG. 15 (circuit of discharging connector 100B) may be provided within discharging connector 511, cable 512 and housing 520 shown in FIG. 16. Converter 150 shown in FIG. 15 may be provided in discharging connector 511 shown in FIG. 16, or may be provided in housing 520 shown in FIG. 16.

Although the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A discharging assembly including a discharging connector configured to be connectable to a discharging port, the discharging assembly comprising:
 a first end to which electric power is input from the connected discharging port;
 a first voltage line, a second voltage line and a neutral line; and
 a second end that outputs first AC power and second AC power, wherein
 the discharging connector includes the first end,
 the first AC power applies a first voltage between the first voltage line and the neutral line,
 the second AC power applies a second voltage between the second voltage line and the neutral line,
 the second end includes a first electrical outlet and a second electrical outlet, the first electrical outlet includes a first voltage terminal connected to the first voltage line, a second voltage terminal connected to the second voltage line, and a ground terminal connected to the neutral line, and the second electrical outlet includes a voltage terminal connected to the first voltage line, and a ground terminal connected to the neutral line.

2. The discharging assembly according to claim 1, wherein
the first voltage line, the second voltage line and the neutral line are provided to extend from the first end to the second end, and
the first AC power and the second AC power are input from the discharging port to the first end, and transmitted to the second end through the first voltage line, the second voltage line and the neutral line.

3. The discharging assembly according to claim 2, wherein
a vehicle includes the discharging port, and the vehicle further includes a power storage device, a first power conversion circuit and a second power conversion circuit,
each of the first power conversion circuit and the second power conversion circuit is configured to receive DC power supplied from the power storage device and output AC power to the discharging port side,
the discharging port includes a first output terminal, a second output terminal, and a ground terminal grounded to a body of the vehicle,
between the first output terminal and the ground terminal in the discharging port, the first AC power is output from the power storage device through the first power conversion circuit,
between the second output terminal and the ground terminal in the discharging port, the second AC power is output from the power storage device through the second power conversion circuit,
the first end includes a first input terminal connected to the first voltage line, a second input terminal connected to the second voltage line, and a ground terminal connected to the neutral line, and
when the discharging connector and the discharging port are connected to each other, the first input terminal, the second input terminal and the ground terminal of the first end are connected to the first output terminal, the second output terminal and the ground terminal of the discharging port, respectively.

4. The discharging assembly according to claim 1, wherein
the discharging assembly further includes a converter that converts two lines connected to the first end into three lines, the three lines including the first voltage line, the second voltage line and the neutral line,
the first end and the converter are electrically connected to each other through the two lines, and
the converter and the second end are electrically connected to each other through the three lines.

5. The discharging assembly according to claim 1, wherein
the second end further includes a third electrical outlet, and
the third electrical outlet includes a voltage terminal connected to the second voltage line, and a ground terminal connected to the neutral line.

6. The discharging assembly according to claim 1, wherein
each of the first voltage and the second voltage is equal to or higher than 95 V and equal to or lower than 150 V.

7. The discharging assembly according to claim 1, wherein
the first end includes a detection terminal that outputs a connector signal indicating a requested voltage value of the discharging connector electrically connected to the discharging port.

8. The discharging assembly according to claim 7, wherein
the connector signal is a potential signal indicating a state of the discharging connector and the discharging port, in addition to the requested voltage value, and
the discharging connector further includes a detection circuit that changes a potential of the detection terminal in accordance with the state of the discharging connector and the discharging port.

9. The discharging assembly according to claim 8, wherein
the neutral line is electrically connected to the detection terminal with the detection circuit interposed therebetween,
the state determined based on the connector signal includes a non-fitted state, a fitted state and a connected state,
the non-fitted state is a state in which the discharging connector and the discharging port are not electrically connected to each other,
the fitted state is a state in which the discharging connector and the discharging port are electrically connected to each other and the discharging connector is not latched,
the connected state is a state in which the discharging connector and the discharging port are electrically connected to each other and the discharging connector is latched, and
the detection circuit includes a switch that works in conjunction with a latch of the discharging connector, and an electric resistance connected in parallel with the switch.

10. The discharging assembly according to claim 1, wherein
the discharging connector includes the second end, in addition to the first end.

11. The discharging assembly according to claim 1, wherein
the discharging assembly further includes a housing into which a circuit electrically connected to the discharging connector is built, and a cable that connects the discharging connector to the housing, and
the housing includes the second end.

12. A power feeding system comprising:
a vehicle including a discharging port; and
a discharging assembly configured to be connectable to the discharging port, wherein
the discharging assembly includes:
a first end to which electric power is input from the connected discharging port;
a first voltage line, a second voltage line and a neutral line; and
a second end that outputs first AC power and second AC power,
the first AC power applies a first voltage between the first voltage line and the neutral line,
the second AC power applies a second voltage between the second voltage line and the neutral line, the second end includes a first electrical outlet and a second electrical outlet, the first electrical outlet includes a first voltage terminal connected to the first voltage line, a second voltage terminal connected to the second voltage line, and a ground terminal connected to the neutral line, the second electrical outlet includes a voltage terminal connected to the first voltage line, and a ground terminal connected to the neutral line, the vehicle further includes a power storage device and a power conversion circuit, and the power conversion circuit is configured to receive electric power supplied from the power storage device and output electric power to the discharging port.

\* \* \* \* \*